United States Patent
Samarthyam et al.

(10) Patent No.: US 11,240,563 B1
(45) Date of Patent: Feb. 1, 2022

(54) PLAYBACK CONTROL OF MEDIA CONTENT ACROSS DEVICES IN MAAS TRANSPORTION NETWORK

(71) Applicant: SONY GROUP CORPORATION, Tokyo (JP)

(72) Inventors: Santhosh Samarthyam, Bangalore (IN); Madhvesh Sulibhavi, Bangalore (IN)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/092,597

(22) Filed: Nov. 9, 2020

(51) Int. Cl.
| H04N 21/472 | (2011.01) |
| H04N 21/482 | (2011.01) |
| H04N 21/214 | (2011.01) |
| H04N 21/45  | (2011.01) |
| H04N 21/438 | (2011.01) |

(52) U.S. Cl.
CPC ... *H04N 21/47217* (2013.01); *H04N 21/2146* (2013.01); *H04N 21/438* (2013.01); *H04N 21/4532* (2013.01); *H04N 21/4826* (2013.01)

(58) Field of Classification Search
CPC ......... H04N 21/47217; H04N 21/2146; H04N 21/4532; H04N 21/4826; H04N 21/438
See application file for complete search history.

(56) References Cited

U.S. PATENT DOCUMENTS

| 8,954,611 | B2 | 2/2015 | Chan et al. |
| 9,832,425 | B2 | 11/2017 | Barnes et al. |
| 10,270,549 | B2 | 4/2019 | Le Roux et al. |
| 2006/0184969 | A1 | 8/2006 | Yamamoto et al. |
| 2011/0314502 | A1* | 12/2011 | Levy .............. H04N 7/106 725/46 |
| 2015/0121431 | A1* | 4/2015 | Jacoby ............ H04N 21/47 725/59 |
| 2016/0127334 | A1* | 5/2016 | Bangole .......... H04L 67/12 713/171 |
| 2016/0286258 | A1* | 9/2016 | Rajagopal ........ H04N 21/2146 |
| 2017/0302711 | A1* | 10/2017 | Velayudhan ...... H04L 65/4084 |
| 2018/0316949 | A1* | 11/2018 | Banerjee .......... H04N 19/40 |
| 2021/0067811 | A1* | 3/2021 | Bates ............. H04N 21/41422 |

OTHER PUBLICATIONS

Liu, et al., "IPTV, Towards Seamless Infotainment", 6th IEEE Consumer Communications and Networking Conference, Feb. 18, 2009, 05 pages.

* cited by examiner

*Primary Examiner* — John R Schnurr
(74) *Attorney, Agent, or Firm* — Chip Law Group

(57) ABSTRACT

A system and method for playback control of media content across devices in a MaaS transportation network is provided. The system receives, from a MaaS network, trip details of an ongoing trip and determines a first vehicle by which a user is set to complete an active first leg of the ongoing trip. The system generates media content recommendations based on the trip details and controls a first display device in use inside the first vehicle, to display such recommendations. The system receives a selection of a first content recommendation and controls a playback of first media content associated with the selection on the first display device. The system detects an event which requires the playback to pause and controls the playback to resume on a second display device in use inside a second vehicle, within duration of a second leg of the ongoing trip or a different trip.

21 Claims, 8 Drawing Sheets

PLAYBACK CONTROL OF MEDIA CONTENT ACROSS DEVICES IN MAAS TRANSPORTION NETWORK

CROSS-REFERENCE TO RELATED APPLICATIONS/INCORPORATION BY REFERENCE

None.

FIELD

Various embodiments of the disclosure relate to the Mobility-as-a-Service (MaaS) technology. More specifically, various embodiments of the disclosure relate to a system and method for a playback control of media content across devices in a MaaS transportation network.

BACKGROUND

In mobility space, there are different transport service providers which offer riding services through one or more modes of public or private transport. Each of such providers may provide their services through infrastructures, which may be based on a closed platform. For example, each of such mobility provider may have a separate ticket processing infrastructure (e.g., ticketing gates and Point-of-Sale (PoS) devices) or a separate application (e.g., a ticket booking application, ticket processing application, and a ride hailing application) to create, pay for, or manage a trip. In some scenarios, a user may plan a trip which involves services of different transport providers. For example, a trip may include a taxi service to cover a first leg of the trip and a metro rail service to cover a remaining portion of the trip. Conventionally, both the transport providers may have their Information Technology (IT) infrastructure and IT operations closed and independent of each other. As a result, no shared services may be available to benefit and entertain the user throughout a duration of the trip.

Limitations and disadvantages of conventional and traditional approaches will become apparent to one of skill in the art, through comparison of described systems with some aspects of the present disclosure, as set forth in the remainder of the present application and with reference to the drawings.

SUMMARY

A system and method for a playback control of media content across devices in Mobility-as-a-Service (MaaS) transportation network is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
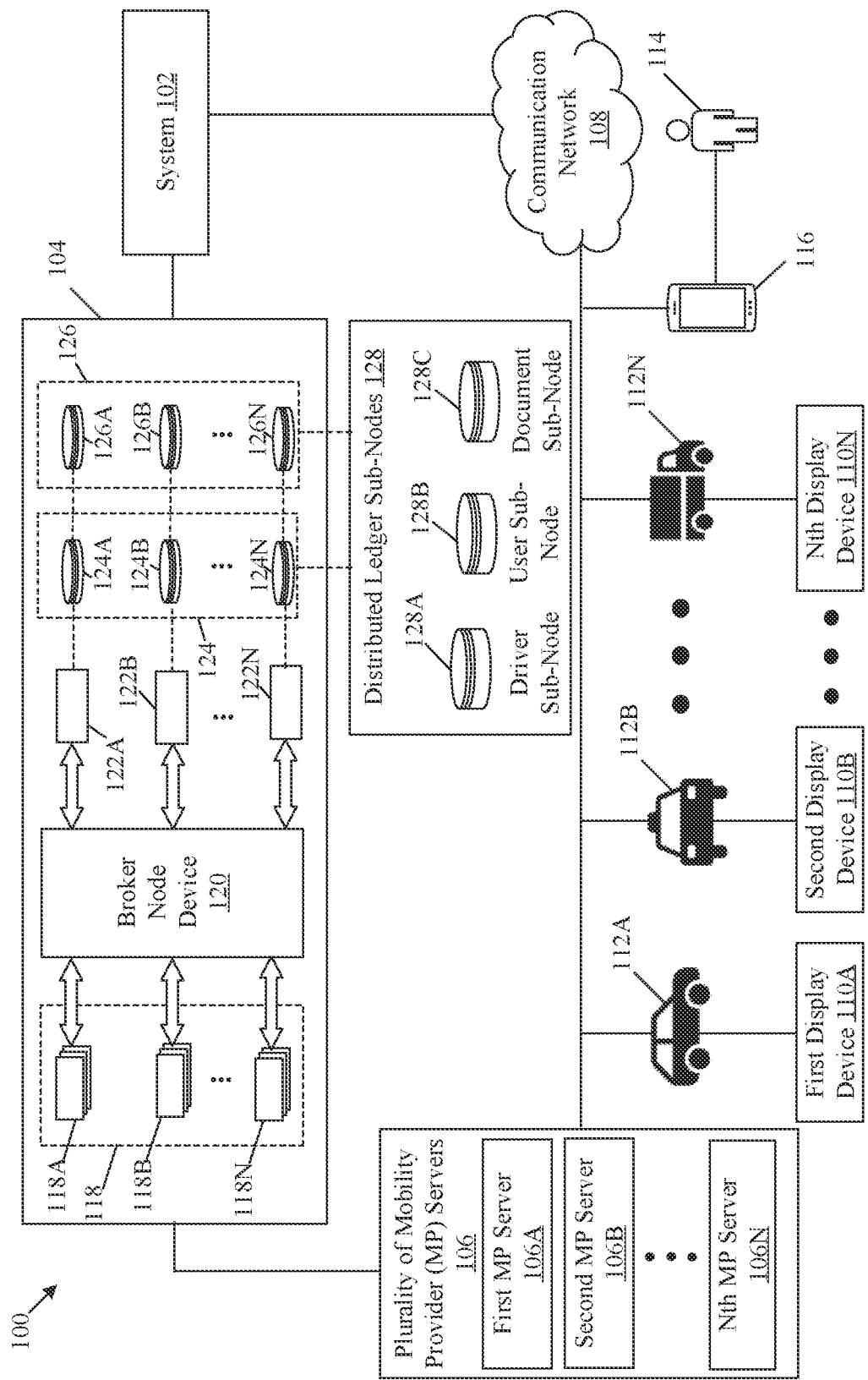
FIG. 1 is a block diagram that illustrates an exemplary network environment that enables playback control of media content across devices in a Mobility-as-a-Service (MaaS) transportation network, in accordance with an embodiment of the disclosure.

The following described implementations may be found in the disclosed a system and method for a playback control of media content across multiple devices. Such devices may be associated with transportation service providers registered on a Mobility-as-a-Service (MaaS) transportation network. The disclosed system may be a part of a federated transportation management system that may facilitate multiple homogeneous or heterogenous mobility providers and their infrastructure, such as ticketing gates, applications, and/or Point of Sale (PoS) devices to operate on the MaaS network to provide various mobility services. Each mobility provider may enjoy secure data ownership and may control co-use of relevant transaction data through a distributed ledger. This may enhance connectivity between the various mobility providers.

Exemplary aspects of the disclosure provide a system that may control playback of a first media content (such as, an audio content, or a video content) across devices in use inside vehicles associated with an ongoing trip of a user. The system may receive trip details associated with the ongoing trip of the user from a MaaS network. For example, the ongoing trip may be divided into legs which may be covered through a plurality of vehicles (such as a first vehicle and a second vehicles) of at least one transportation service provider associated with the MaaS network. The system may determine the first vehicle as a vehicle by which the user may be set to complete an active first leg of the ongoing trip. The system may generate a set of media content recommendations based on the received trip details and a media consumption history associated with the user. Therefore, the system may provide customized media content to the user and may thereby enhance user experience. Thereafter, the system may receive a user selection of a first media content recommendation via a first display device that may be in use inside the determined first vehicle. Based on the user selection, the system may control a playback of the media content associated with the first media content recommendation on the first display device. Within a duration of the ongoing trip, the system may detect an event, which may require to pause the playback of the media content. Examples of the event may include, but are not limited to, an end of the active first leg of the ongoing trip, and a user input to pause the playback of the media content. The system may control the playback of the first media content to resume on a second display device in use inside the second vehicle and within a duration of a second leg of the ongoing trip or a duration of a different trip of the user. For example, the system may record a timestamp at which the playback of the first media content may be paused based on the detected event. The system may control the playback of the first media content to resume from the recorded timestamp on the second display device in use inside the second vehicle and within the duration of the second leg of the ongoing trip or the duration of the different trip of the user.

As the system enables a seamless streaming and playback of media content on different display devices (in-vehicle displays or personal mobile devices) throughout a duration of one or more trips, the user may be able to watch, pause and then resume the playback of the media content at any time-instant within a duration of such trips. Such a seamless streaming and playback of the media content may be enabled for the user, even if the trip is covered through vehicles managed by different transport service providers. The system of the present disclosure may ensure effective monetization of the media content by real-time allocation, distribution, and/or settlement of payments using smart contracts. Thus, the system of the present disclosure may ensure seamless, and cost-effective consumption of the media content on display devices used throughout one or more trips in a MaaS transportation space.

FIG. 1 is a block diagram that illustrates an exemplary network environment that enables playback control of media content across devices in a Mobility-as-a-Service (MaaS) transportation network, in accordance with an embodiment of the disclosure. With reference to FIG. 1, there is shown a network environment 100. The network environment 100 may include a system 102, a MaaS network 104, and a plurality of mobility provider (MP) servers 106. The plurality of MP servers 106 may include a first MP server 106A, a second MP server 106B, . . . , and an Nth MP server 106N. The network environment 100 may further include a communication network 108. There is further shown a plurality of display devices, which may include a first display device 110A, a second display device 110B, . . . , and an Nth display device 110N. As shown, for example, the first display device 110A, the second display device 110B, . . . , and the Nth display device 110N may be accessible inside a first vehicle 112A, a second vehicle 112B, . . . , and an Nth vehicle 112N, respectively. The first vehicle 112A, the second vehicle 112B, . . . , and the Nth vehicle 112N may be collectively referred to as a plurality of vehicles 112A, 112B . . . 112N. In at least one embodiment, one or more of the plurality of vehicles 112A, 112B . . . 112N may lack any in-vehicle display device. There is further shown a user 114 who may be associated with a display device 116.

The MaaS network 104 may be associated with a publish-subscribe pattern. The MaaS network 104 may include a plurality of publisher nodes 118A, 118B, . . . 118N, a broker node device 120, and a plurality of subscriber nodes 122A, 122B . . . 122N. The MaaS network 104 may further include a plurality of mobility provider (MP) nodes 124A, 124B, . . . 124N of a first distributed ledger 124 and a plurality of MaaS nodes 126A, 126B . . . 126N of a second distributed ledger 126. Moreover, the MaaS network 104 may include distributed ledger sub-nodes 128 that may include a driver sub-node 128A, a user sub-node 128B, and a document sub-node 128C. Further, there is shown the system 102 that may be communicatively coupled to the MaaS network 104 or with the second distributed ledger 126 of the MaaS network 104.

In FIG. 1, the number of nodes of the MaaS network 104, the number of MP servers in the plurality of MP servers 106, the number of display devices 110A, 110B . . . 110N, and the number of vehicles 112A, 112B . . . 112N are merely presented as an example and should not be construed as limiting for the disclosure. The present disclosure may also be applicable to more or a lesser number of nodes, MP servers, display devices, and vehicles for playback control of media content across devices in a MaaS transportation network, without a deviation from the scope of the disclosure. For the sake of brevity, only N number of the nodes of the MaaS network 104, N number of servers of the plurality of MP servers 106, N number of display devices 110A, 110B . . . 110N, and N number of vehicles 112A, 112B . . . 112N have been shown in FIG. 1. However, in some embodiments, there may be more or less than N number of the nodes of the MaaS network 104, the number of servers of the plurality of MP servers 106, the display devices 110A, 110B . . . 110N, and the vehicles 112A, 112B . . . 112N, without limiting the scope of the disclosure. Further, one vehicle (such as the first vehicle 112A) may be associated with one mobility provider server (such as the first MP server 106A). One mobility provider server may be associated with multiple vehicles, without limiting the scope of the disclosure.

The system 102 may include suitable logic, circuitry, code, and/or interfaces that may be configured to control a delivery of media content to various display devices which may be accessed inside the plurality of vehicles 112A, 112B . . . 112N in various legs of a trip. For example, if the user 114 starts a playback of a program in a first leg of an ongoing trip, then the user 114 may be able pause and resume the playback on any of the subsequent legs of the same ongoing trip or a different trip. The trip may be booked through a MaaS transportation service, fulfillment of which may be tracked and managed through the MaaS network 104.

Figure 2:
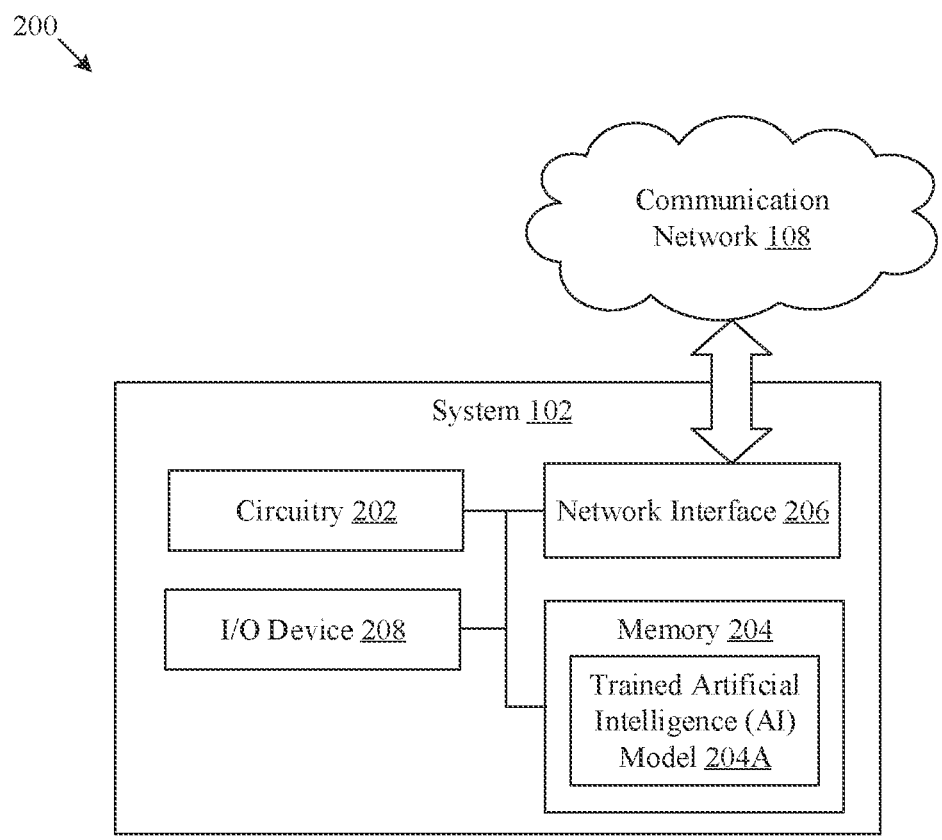
FIG. 2 is a block diagram of an exemplary system for a playback control of media content across devices in a MaaS transportation network, in accordance with an embodiment of the disclosure.

In an embodiment, the system 102 may be an artificial intelligence (AI) system that may include a trained AI model (as shown in FIG. 2, for example). The trained AI model may include one or more machine learning models or one or more trained neural network models. The trained AI model of the system 102 may recommend a set of media content for playback on various display devices of the plurality of vehicles 112A, 112B . . . 112N and/or the display device 116 based on trip details of the user 114, media consumption history of the user 114, a user profile of the user 114, and/or device specifications of the various display devices.

Example implementations of the system 102 may include, but are not limited to, a virtual machine (VM) on a host machine, a container or a virtual runtime environment of an Operating System (OS) on a host machine or server, a containerized application on a server, a BareMetal server, a cloud server (such as a private, a public or a hybrid cloud), a workstation, a media server, or any device with a capability to generate and stream media content to a cluster of devices. In an embodiment, the system 102 may be implemented as a VM or container on a server or a server node of the plurality of MP servers 106.

The MaaS network 104 may support a standard specification for communication. The MaaS network 104 may include publisher nodes (e.g., ticket readers or ride booking applications), subscriber nodes, and at least one broker node device to communicate transaction messages from the publishers nodes to the subscriber nodes, in accordance with a publish-subscribe network protocol, such as, but not limited to, a Message Queuing Telemetry Transport (MQTT)-based messaging protocol, an Advanced Message Queuing Protocol (AMQP)-based messaging protocol, or a Message-Oriented Middleware (MOM)-based messaging framework. In at least one embodiment, the MaaS network 104 may include a distributed ledger which may include ledger nodes to record transactions associated with various mobility services, such as ticketing transactions of a MaaS transportation service, media usage or consumption statistics, or settlement of payments among various stakeholders, such as content owners, transportation providers, or operators of the MaaS network 104.

The publisher nodes of all transportation service providers associated with the MaaS network 104 may follow a standard or common communication protocol for data exchange. The MaaS network 104 may include homogeneous publisher nodes that may follow the MaaS standard specification for communication. In an embodiment, the MaaS network 104 may also include heterogeneous publisher nodes that may follow proprietary communication protocols. The MaaS network 104 may offer a plug-in based support to the publisher nodes so that such heterogeneous publisher nodes can be supported until the respective transportation service providers adhere to and provide support for the MaaS standard specification for communication.

The MaaS network 104 may enable the publisher nodes associated with different transportation providers to join the MaaS network 104. Through a node management device, the MaaS network 104 may provide bulk cluster management of the publisher nodes. All the publisher nodes may follow set protocols to operationalize on the MaaS network 104. The set protocols may mandate a common security architecture (for publisher node authentication and authorization), a network protocol (e.g., HTTP, MQTT, AMQP, and the like), a uniform data request or response format (e.g., JSON, CSV, or XML format), and an API/data scheme. This may ensure that each publisher node follows a cluster-level configuration (such as a device profile including a company name, a company ID, a gate ID, a gate number, and the like) and a device-level certificate (i.e., the authentication credential). The pattern of cluster-level configuration and the set protocols may facilitate transport providers to deploy new publisher nodes or replace existing publisher nodes with a plug-and-play approach. This may facilitate the MaaS network 104 to function as a homogeneous transportation network with interoperability between resources (such as publisher node devices) of the various transportation providers.

Each of the plurality of publisher nodes 118A, 118B . . . 118N may include suitable logic, circuitry, code, and/or interfaces that may be configured to operate as a ticket processing client for a transportation service of a respective transportation service provider. For example, as a ticket processing client, each of the plurality of publisher nodes 118A, 118B . . . 118N may read, issue, recharge, or cancel tickets to create events associated with a respective transport service. Based on such events, transaction messages may be communicated to one or more subscriber nodes (such as the plurality of subscriber nodes 122A, 122B . . . 122N) of the MaaS network 104 through the broker node device 120.

Examples of the plurality of publisher nodes 118A, 118B . . . 118N may include, but are not limited to, a consumer electronic device with a trip planning or booking application, a ticket reader on a ticketing gate, a ticketing kiosk a Point-of-Sale (PoS) device, a mobile POS, a ticket vending machine, a smart door of a transport vehicle which may read a ticket to start or end a ride.

Each of the plurality of subscriber nodes 122A, 122B . . . 122N may include suitable logic, circuitry, code, and/or interfaces that may be configured to receive the transaction messages, through the broker node device 120, from one or more of the plurality of publisher nodes 118A, 118B . . . 118N. Each transaction message may include a topic which may be subscribed by one or more subscriber nodes of the plurality of subscriber nodes 122A, 122B . . . 122N. Example implementations of a subscriber node may include, but are not limited to, a web server, an edge device, an edge node, a cloud server, a cluster node of cloud-based servers, a workstation, or any computing device with a fog computing capability.

A first publisher node 118A of the plurality of publisher nodes 118A, 118B . . . 118N and a first subscriber node 122A of the plurality of subscriber nodes 122A, 122B . . . 122N may be associated with a first transportation provider. Other nodes, such as a second publisher node 118B and a second subscriber node 122B may be associated with the first transportation provider or a second transportation provider which may be different from the first transportation provider. Further, the first publisher node 118A may be associated with the first MP server 106A and the second publisher node 118B may be associated with the second MP server 106B, and so on.

The broker node device 120 may include suitable logic, circuitry, code, and/or interfaces that may be configured to route transaction messages from a publisher node (such as the first publisher node 118A) to a subscriber node (such as the first subscriber node 122A). Decisions to authorize the broker node device 120 to route such transaction messages to the subscriber nodes may be determined by a server (not shown in FIG. 1) associated with the MaaS network 104. Example implementations of the broker node device 120 may include, but are not limited to, an application server, a cloud server, a mainframe server, a database server, a web server, or other type of servers.

The broker node device 120 may be configured to communicate with each of the plurality of publisher nodes 118A, 118B . . . 118N and the plurality of subscriber nodes 122A, 122B . . . 122N through a suitable publish-subscribe network protocol, such as, but not limited to, a MQTT-based messaging protocol, an AMQP-based messaging protocol, or a Message-Oriented Middleware (MOM)-based messaging framework.

The plurality of MP nodes 124A, 124B, . . . 124N may include suitable logic, circuitry, code, and/or interfaces that may be configured to store transaction data associated with a respective mobility provider. For example, a first MP node 124A may store transaction data associated with a first mobility provider. The transaction data may include records of trips of users. Each trip may correspond to a MaaS transportation service that may be provided by the first transportation provider (for example, associated with the first MP server 106A) in at least one leg of the trip. Each of the plurality of MP nodes may be referred to as nodes of the first distributed ledger 124 that may store transaction data of the various mobility providers of the MaaS network 104.

The plurality of MaaS nodes 126A, 126B, . . . 126N may include suitable logic, circuitry, code, and/or interfaces that may be configured to store transaction data associated with all mobility providers of the MaaS network 104. The storage of the transaction data associated with each of the transportation service providers may be used to settle payments amongst the transportation service providers for transportation services offered to users. Each of the plurality of MaaS nodes 126A, 126B . . . 126N may correspond to nodes of the second distributed ledger 126 that may store transaction data associated with the MaaS network 104.

Each of the plurality of the MP nodes 124A-124N and each of the plurality of MaaS nodes 126A, 126B . . . 126N may be associated with the distributed ledger sub-nodes 128. For e.g., each of the first MP node 124A and the first MaaS node 126A may be associated with the driver sub-node 128A, the user sub-node 128B, and the document sub-node 128C of the distributed ledger sub-nodes 128. Further, each of the second MP node 124B and the second MaaS node 126B may be associated with the driver sub-node 128A, the user sub-node 128B, and the document sub-node 128C of the distributed ledger sub-nodes 128. Similarly, each of the Nth MP node 124N and the Nth MaaS node 126N may be associated with the driver sub-node 128A, the user sub-node 128B, and the document sub-node 128C of the distributed ledger sub-nodes 128. The driver sub-node 128A of the distributed ledger sub-nodes 128 may store driver profile information associated with mobility providers of the MaaS network 104. In an embodiment, the driver sub-node 128A may store an event timeline (or event tracking information) associated with a driver. Exemplary information that may be included in the event timeline associated with the driver may include, but is not limited to, a scorecard associated with the driver, a profile associated with the driver, behavior information associated with the driver, and an event context, such as, traffic information, an action of the driver, and a speech of the driver. The user sub-node 128B of the distributed ledger sub-nodes 128 may store user (or passenger) information associated with the mobility providers of the MaaS network 104. In an embodiment, the user sub-node 128B may store an event timeline (or event tracking information) associated with the user. Exemplary information that may be included in the event timeline associated with the user may include, but is not limited to, user-specific settings and preferences (such as privacy settings). The user-specific settings and preferences may help the mobility providers and the MaaS provider to ensure that data privacy standards, legal obligations, and rules (such as General Data Protection Regulation (GDPR)) may be complied with respect to a storage of user data in distributed ledger nodes/sub-nodes. The document sub-node 128C of the distributed ledger sub-nodes 128 may store log information associated with the vehicles 112A, 112B . . . 112N of the mobility providers of the MaaS network 104. Moreover, the document sub-node 128C may store notification information and messages generated based on the determined one or events associated with the MaaS network 104. In an embodiment, the document sub-node 128C may store a track ID (e.g., a media content ID) associated with media content that may be played back or recommended for a user. The document sub-node 128C may further store a play or resume ID associated with a timestamp in the media content that has been last played back or a timestamp at which a play back of the media content has been last paused, and a user ID associated with the media content.

The plurality of subscriber nodes 122A, 122B . . . 122N may be associated with a corresponding node of the first distributed ledger 124. For example, the first subscriber node 122A may be associated with the first MP node 124A of the first distributed ledger 124, the second subscriber node 122B may be associated with a second MP node 124B of the first distributed ledger 124, . . . and so on.

In an embodiment, at least two ledger nodes of each of the first distributed ledger 124 and the second distributed ledger 126 may store transaction data associated with a MaaS transportation service. The MaaS transportation service may be associated with one or more of: the plurality of transportation providers and/or the user 114 (for example, a passenger) who may avail the MaaS transportation service through a unified MaaS interface or through the plurality of publisher nodes 118A, 118B . . . 118N. The transaction data associated with the MaaS transportation service may be included in a set of state objects, such as an initial state object and an updated version of the initial state object. Each state object may include a smart contract, a contract code (or rules of a transaction upon which parties to the transaction agree), and state properties (that may be updated when the transaction data is updated based on transaction requests from the plurality of publisher nodes 118A, 118B . . . 118N).

In at least one embodiment, each of the first distributed ledger 124 and the second distributed ledger 126 may be a decentralized and distributed database system that may maintain an immutable record of data operations or transactions. A set of data operations may be grouped together as a block and may be further linked to a previous block of data operations to form a chain of a plurality of blocks. All blocks of data operations may be stored in a decentralized manner, in which at least two participants or nodes of each of the first distributed ledger 124 and the second distributed ledger 126 may store a subset of the plurality of blocks associated with one or more transactions in which the at least two participants or nodes may participate. Further, each of the first distributed ledger 124 and the second distributed ledger 126 may include an operating system (for example, a Java Virtual Machine (JVM)) which may allow deployment of a smart contract between multiple parties, for example, mobility provider node(s) of the first transportation provider) and a counter-party node (i.e. the MaaS provider node).

By way of example, and not limitation, each of the first distributed ledger 124 and the second distributed ledger 126 may be a distributed ledger technology (DLT) system, such as, blockchain based system (for example, a Corda blockchain, an Ethereum blockchain, or a Hyperledger blockchain). Each of the first distributed ledger 124 and the second distributed ledger 126 may store a set of immutable state objects that may be tracked by the first distributed ledger 124 and the second distributed ledger 126, respectively. The state object may include a set of distributed ledger compatible rules for different types of distributed ledger technologies. For example, the state object may include transaction data, such as, a smart contract between parties, contract code (rules of transaction), and content including state properties with certain state values. The smart contract may include a set of conditions under which multiple parties to the smart contract may agree to interact with each other. The smart contract may run on one or more nodes of each of the first distributed ledger 124 and the second distributed ledger 126 and may govern transitions between state objects to generate a transaction. The smart contract may be written once, reused for a large numbers of state objects, and may refer to a governing legal prose by way of cryptographic hashes.

Each of the first distributed ledger 124 and the second distributed ledger 126 may use secure cryptographic hashes to identify parties and data and also to link a state object to a previous version of the state object to provide chains of provenance. A transaction between a group of parties may be stored on the first distributed ledger 124 and the second distributed ledger 126 such that only the group of parties associated with the transaction may be able to view the transaction. A party associated with a transaction may store a current state object of the transaction in a vault (a database associated with a respective distributed ledger, such as, the first distributed ledger 124 and the second distributed ledger 126). Another party eligible to view or process the transaction (e.g., validate the transaction) may retrieve the current state object of the transaction from the vault. Additionally, each state object of each of the first distributed ledger 124 and the second distributed ledger 126 may include a smart contract between the parties or nodes that may participate in an associated transaction.

On each of the first distributed ledger 124 and the second distributed ledger 126, a participant or a node (for example, the first MP node 124A) may update a transaction by updating state properties of an input state object (for example, the first state object) to produce an output state object (for example, the second state object). The updated transaction may thereby create a chain of provenance (which may be associated with the transaction data). Each of the first distributed ledger 124 and the second distributed ledger 126 may provide a consensus for the updated transaction based on a determination of a validity of the updated transaction and a determination of a uniqueness of the updated transaction. In an embodiment, the participants of nodes associated with the updated transaction may determine the validity of the updated transaction by an independent execution of smart contracts and validation logic associated with the transaction. Further, a consensus node associated with the each of the first distributed ledger 124 and the second distributed ledger 126 may determine the uniqueness of the updated transaction based on a check that there exists no other transaction that has reached a consensus by use of the same input state object as the current transaction.

In accordance with an embodiment, each of the first distributed ledger 124 and the second distributed ledger 126 may be associated with a decentralized application that may include a client-side interface (a front-end) and a server-side interface (a back end). The decentralized application may be configured to implement a workflow (e.g., a Corda flow) associated with the blockchain to record a transaction on a node of a distributed ledger (such as, the first MP node 124A of the first distributed ledger 124 and/or the first MaaS node 126A of the second distributed ledger 126). The client-side interface may be hosted on each of the plurality of subscriber nodes 122A, 122B . . . 122N and the client-side interface may be configured to load up on a client associated with a subscriber node. For example, the client-side interface of the decentralized application may be a Remote Procedure Call (RPC) client that may be configured on each subscriber node and the counter-party node (i.e. the MaaS provider node). The server-side interface of the decentralized application may run on each node of each of the first distributed ledger 124 and the second distributed ledger 126 associated with a corresponding subscriber node and the counter-party node.

In an embodiment, the transaction request from a publisher node may initiate a MaaS transaction between a mobility provider node (such as, the first MP node 124A of the first distributed ledger 124) and a MaaS provider node (i.e. the counter-party node). The first distributed ledger 124 may store records for the MaaS transaction between two parties, i.e., the mobility provider node (e.g., the first MP node 124A of the first mobility provider), the MaaS provider node (i.e. the counter-party node), and/or one or more users (e.g., the user 114). The second distributed ledger 126 may store records for MaaS transactions between any mobility provider node (e.g., the first MP node 124A, the second MP node 124B, . . . and the Nth MP node 124N), the MaaS provider node (i.e., the counter-party node), and/or the one or more users (e.g., the user 114).

In case of multiple MaaS providers, an exemplary implementation may include a plurality of MaaS provider nodes, each of which may be associated with a certain MaaS provider and may be included in a separate distributed ledger for the respective MaaS provider. In certain scenarios, the plurality of MaaS provider nodes may be included in a common distributed ledger, such as the second distributed ledger 126.

In an embodiment, the first MP node 124A and the first MaaS node 126A may be one of many database nodes of the first distributed ledger 124 and the second distributed ledger 126, respectively, and may be configured to receive a transaction message via the first subscriber node 122A. Each of the first MP node 124A and the first MaaS node 126A may be configured to update an initial state object associated with the first distributed ledger 124 and the second distributed ledger 126, respectively, based on the transaction message to output an updated state object. The first MP node 124A and the first MaaS node 126A may build a transaction that may include the initial state object with initial transaction data and the updated state object with updated transaction data.

In an embodiment, the second distributed ledger 126 may also store the trip details of one or more users (e.g., the user 114) based on transaction messages received from one or more publisher nodes of the MaaS network 104. In an example, the transaction message may include information related to a source and a destination of an ongoing trip of a user (e.g., the user 114), trip route information, a duration of the ongoing trip, one or more legs of the ongoing trip, a duration of each leg of the ongoing trip, at least one transportation service provider, and details of a plurality of vehicles (e.g., the plurality of vehicles 112A, 112B . . . 112N) of the at least one transportation service provider. A first distributed ledger node (e.g., the first MaaS node 126A) of the second distributed ledger 126 may transmit the trip details of a user (e.g., the user 114) to the system 102.

In an embodiment, the second distributed ledger 126 (including, for example, a first distributed ledger node, such as, the first MaaS node 126A) may further store a trip status associated with ongoing trips of one or more users (e.g., the user 114). The trip status may include information related to, but not limited to, an active leg or ongoing leg of a trip of the user 114, a vehicle on which the user 114 may be on-board to cover the active leg, and a source location and destination location associated with the active leg. The first distributed ledger node (such as the first MaaS node 126A) may be configured to transmit the stored trip status associated with the ongoing trip of the user 114 to the system 102.

The plurality of MP servers 106 may include suitable logic, circuitry, code and/or interfaces that may be configured to collectively manage a trip and trip details associated with transport service providers. For example, the first MP server 106A may be configured to manage the trip details associated with the first transportation service provider. The second MP server 106B may be configured to manage the trip details associated with a second transportation service provider. The Nth MP server 106N may be configured to manage the trip details associated with an Nth transportation service provider. Each of the plurality of MP servers 106 may be implemented as a cloud server and may execute operations through web applications, cloud applications, HTTP requests, repository operations, file transfer, and the like. Other example implementations of each of the plurality of MP servers 106 may include, but are not limited to, a database server, a file server, a web server, a media server, an application server, a mainframe server, or a cloud computing server. In at least one embodiment, each of the plurality of MP servers 106 may be implemented as a plurality of distributed cloud-based resources by use of several technologies that are well known to those ordinarily skilled in the art. In some embodiments, one or more of the plurality of MP servers 106 may be implemented within the respective vehicle, such as the first vehicle 112A, the second vehicle 112B, . . . and the Nth vehicle 112N.

The communication network 108 may include a communication medium by which each node of the MaaS network 104 may communicate with the plurality of MP servers 106 and the system 102. Further, the communication network 108 may include a communication medium by which the system 102 may communicate with the plurality of display devices, such as the first display device 110A, the second display device 110B, the Nth display device 110N, and the display device 116.

Figure 4:
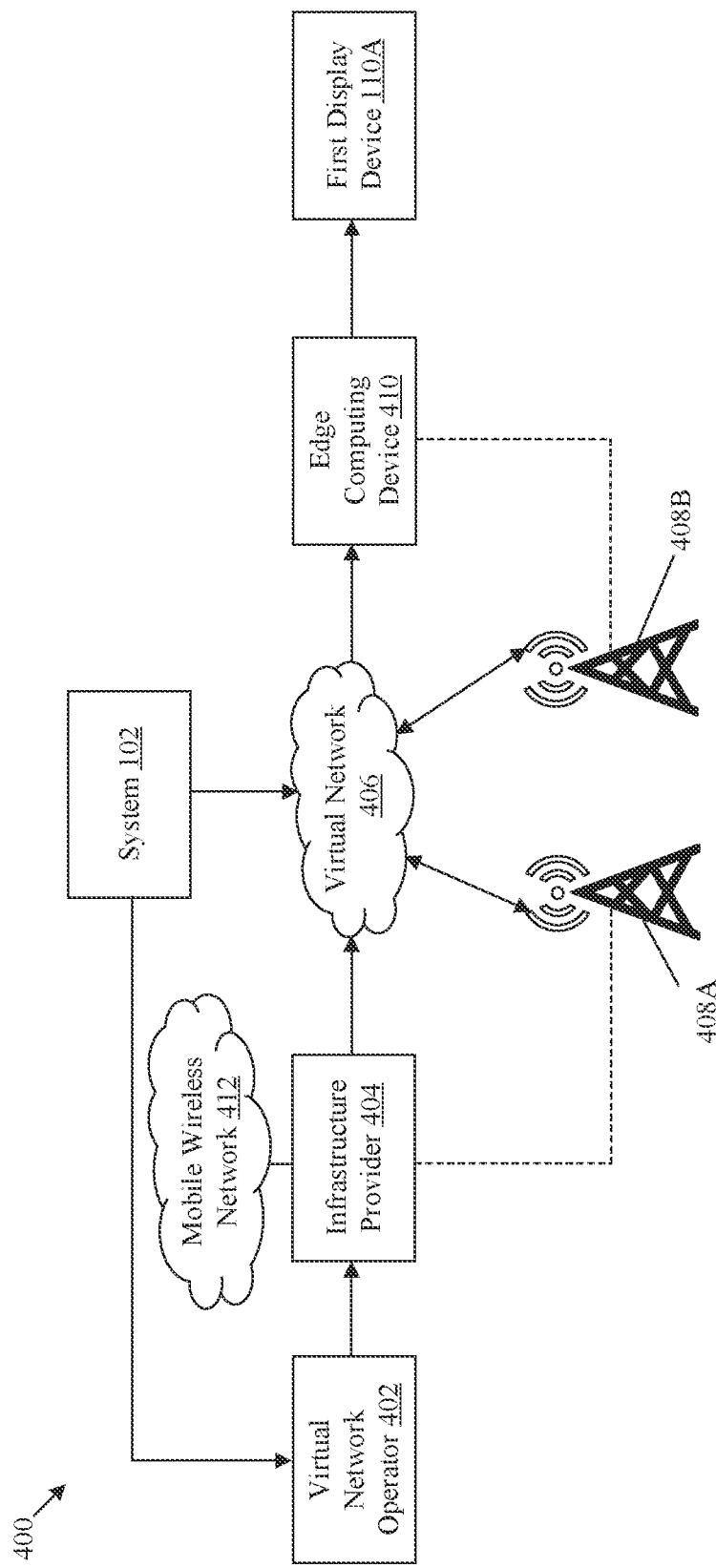
FIG. 4 is a block diagram that illustrates an exemplary network environment for transmission of chunks of media content to a display device for playback of the media content, in accordance with an embodiment of the disclosure.

In an exemplary embodiment, the communication network 108 may include a mobile wireless network (as shown in FIG. 4) by which the system 102 may communicate with the plurality of display devices. In such a case, the mobile wireless network may be suitable for seamless transmission of media content and other information to different display devices (such as the first display device 110A and the second display device 110B) when such devices are used inside vehicles (such as the first vehicle 112A and the second vehicle 112B) in several legs of an ongoing or different trip of the user 114.

Examples of the communication network 108 may include, but are not limited to, the Internet, a cloud network, a Wireless Fidelity (Wi-Fi) network, a Personal Area Network (PAN), a Local Area Network (LAN), or a Metropolitan Area Network (MAN), a mobile wireless network, such as a Long-Term Evolution (LTE) network (for example, 4th Generation or 5th Generation (5G) mobile network). Various nodes of the MaaS network 104 may be configured to connect to the communication network 108, in accordance with various wired or wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The plurality of display devices may include the first display device 110A, the second display device 110B, . . . and the Nth display device 110N. Each of such devices may include suitable logic, circuitry, and/or interfaces that may be configured to display or render media content. In an embodiment, at least one of such display devices may be an in-vehicle display of a vehicle (as one of the plurality of vehicles 112A, 112B . . . 112N). In another embodiment, at least one of such display devices may be a personal mobile device, which can be carried by the user 114 throughout a duration of a trip. Examples of such display devices may include, but are not limited to, a dashboard display inside a vehicle, a rear seat entertainment device inside a vehicle, a headrest display inside a vehicle, or a personal mobile device of the user 114.

Each of the first display device 110A, the second display device 110B, . . . and the Nth display device 110N may include a display unit that may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display unit of the display device may refer to a display screen of a head mounted device (HMD), a smart-glass device, a see-through display, a projection-based display, an electro-chromic display, or a transparent display. In one embodiment, each of the first display device 110A, the second display device 110B, . . . and the Nth display device 110N may be a touch-enabled device which may enable the user 114 to provide a user input via the display device.

Each of the plurality of vehicles 112A, 112B . . . 112N, such as the first vehicle 112A, the second vehicle 112B, . . . and the Nth vehicle 112N may be owned, leased, or managed by a transportation service provider associated with the MaaS network 104. Each of such vehicles may be offered as part of a public transportation service or a private transportation service. When the user 114 books a trip on the MaaS network 104, the trip may be divided into legs, which may be covered through the plurality of vehicles 112A, 112B . . . 112N (as one or more modes of transport). Examples of such modes of transport may include, but are not limited to, a rail, a bus, a car, an airplane, a taxi or a cab, a trolley, a tram, a ferry, a rapid transit, a truck, or a bike. Each of the plurality of vehicles 112A, 112B . . . 112N may be associated with one of such modes of transport. In FIG. 1, the depiction of the plurality of vehicles 112A, 112B . . . 112N, such as the first vehicle 112A, the second vehicle 112B, and the Nth vehicle 112N as a car, a taxi, and a truck is merely provided as an example, and should not be construed as limiting for the disclosure. The present disclosure may be applicable to vehicles which may be associated with other available modes of public or private transport.

The display device 116 may be a personal mobile device of the user 114. The display device 116 may include suitable logic, circuitry, and/or interfaces that may be configured to display or render media content. Example implementations of the display device 116 may include, but are not limited to, a smartphone or a mobile phone, an audio player, a wearable audio device (such as a headphone), a smart wearable display, a tablet, a laptop, a laptop, or a head-mounted display. Further description of the display device 116 is omitted from the disclosure for the sake of brevity. In an embodiment, the display device 116 may be a shared device in a transport vehicle, such as a bus or a rail.

Figure 3:
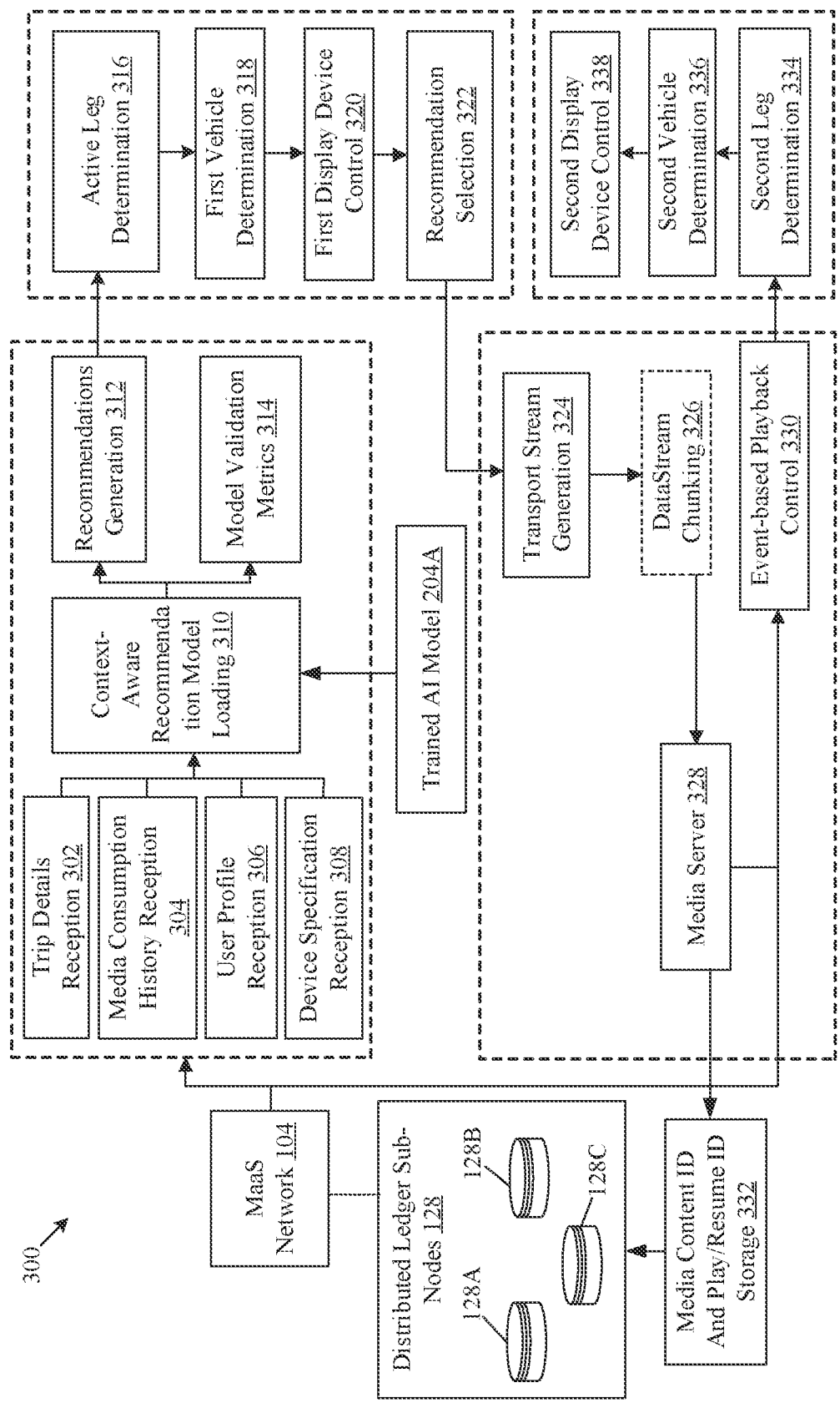
FIG. 3 is a block diagram that illustrates exemplary operations for a playback control of media content across devices in a MaaS transportation network, in accordance with an embodiment of the disclosure.

In operation, the system 102 may be configured to receive, from the MaaS network 104, trip details associated with an ongoing trip of the user 114 (as described, for example, in FIG. 3). Each of the first vehicle 112A, the second vehicle 112B, . . . and the Nth vehicle 112N may be registered with a transportation service provider. The system 102 may determine the first vehicle 112A as a vehicle by which the user 114 may be set to complete an active first leg of the ongoing trip.

The system 102 may generate a set of media content recommendations based on the received trip details and a media consumption history associated with the user 114. In some embodiments, the set of media content recommendation may be generated further based on a user profile associated with the user 114 and a device specification associated with a display device (such as the first display device 110A).

At any time-instant within the duration of the ongoing trip, the system 102 may control the first display device 110A to display the generated set of media content recommendations. The first display device 110A may be in use inside the determined first vehicle 112A within a duration of the active first leg of the ongoing trip. The system 102 may receive a user selection of a first media content recommendation of the displayed set of media content recommendations. Details associated with the generation of the set of media content recommendations, the display of the set of media content recommendations, and the user selection of a media content recommendation are provided, for example, in FIG. 3.

The system 102 may control a playback of first media content associated with the first media content recommendation on the first display device 110A. At any time-instant within the duration of the ongoing trip (such as a duration of the active first leg), the system 102 may detect a first event which may require the playback of the first media content to pause. For example, the first event may be detected based on an end of the active first leg of the ongoing trip or a user input by the user 114 to pause the playback of the first media content. Within a duration of a second leg of the ongoing trip or a duration of a different trip of the user 114, the system 102 may control the playback of the first media content to resume on the second display device 110B. When the playback resumes, the second display device 110B may be in use inside the second vehicle 112B.

In certain scenarios, the first media content or a portion of the first media content (such as a set of cached chunks of the media stream) may be stored on the second vehicle 112B or a display device (e.g., the second display device 110B) inside the second vehicle 112B, and further, the second vehicle 112B may be in a physical proximity of the first vehicle 112A. In such cases, the first display device 110A and the second display device 110B may establish a communication link between each other based on the physical proximity of the first vehicle 112A and the second vehicle 112B, for example, through an Internet-of-Things (IoT) network (such as, a Vehicle-to-Vehicle (V2V) network or a Vehicle-to-Everything (V2X) network). Thus, the first display device 110A may receive the first media content or the set of cached chunks of the media stream from the second vehicle 112B or the second display device 110B. This may be useful in cases of handovers (e.g., in 5G cellular networks) or lack of network bandwidth of the communication network 108. The first display device 110A may receive the first media content or the cached chunks of the media stream from the second display device 110B associated with the second vehicle 112B. Similarly, through the IoT network (such as the V2V network or the V2X network), the first display device 110A may receive other media content which may have been previously streamed or cached on the second display device 110B inside the second vehicle 112B.

As the system 102 enables a seamless streaming and playback of media content on different display devices (in-vehicle displays or personal mobile devices) throughout a duration of one or more trips, the user 114 may be able to watch, pause and then resume the playback of the media content at any time-instant within a duration of such trips. Such a seamless streaming and playback of the media content may be enabled for the user 114, even if the trip is covered through vehicles managed by different transport service providers. For example, the system 102 may control the playback of the first media content to pause on the first display device 110A when the active first leg ends and resume on the second display device 110B when a second leg of the ongoing trip or a different trip commences. Such control may be based on a user input via the first display device 110A to pause the playback and another user input via the second display device 110B to resume the paused playback.

FIG. 2 is a block diagram of an exemplary system for a playback control of media content across devices in a MaaS transportation network, in accordance with an embodiment of the disclosure. FIG. 2 is explained in conjunction with elements from FIG. 1. With reference to FIG. 2, there is shown a block diagram 200 of the system 102. The system 102 may include circuitry 202, a memory 204, and a network interface 206. The system 102 may further include an input/output (I/O) device 208. The memory 204 may include a AI model 204A.

The circuitry 202 may include suitable logic, circuitry, and interfaces that may be configured to execute program instructions associated with different operations to be executed by the system 102. The circuitry 202 may be implemented based on a number of processor technologies known in the art. Examples of the processor technologies may include, but are not limited to, a Central Processing Unit (CPU), X86-based processor, a Reduced Instruction Set Computing (RISC) processor, an Application-Specific Integrated Circuit (ASIC) processor, a Complex Instruction Set Computing (CISC) processor, a Graphical Processing Unit (GPU), and other processors.

The memory 204 may include suitable logic, circuitry, and interfaces that may be configured to store the program instructions to be executed by the circuitry 202. The memory 204 may be configured to store trip details, a user profile, a device specification, and a media consumption history. The memory 204 may be further configured to store a time stamp associated with a pause of the playback of the first media content. The memory 204 may be further configured to store the AI model 204A. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The AI model 204A may be a classifier or regression model which may be trained to identify a relationship between inputs, (such as features in a training dataset that may include a dataset of trip details, media consumption history, user profile data, device specification, or a set of media content) and output labels that may include a dataset of classified recommended media content from the set of media content. The AI model 204A may be defined by its hyper-parameters, for example, number of weights, cost function, input size, number of layers, and the like. The hyper-parameters of the AI model 204A may be tuned and weights may be updated so as to move towards a global minimum of a cost function for the AI model 204A. After several epochs of the training on the feature information in the training dataset, the AI model 204A may be trained to output a prediction/classification result for a set of inputs. The prediction result may be indicative of a class label for each input of the set of inputs (e.g., input features extracted from new/unseen instances).

The AI model 204A may include electronic data, such as, for example, a software program, code of the software program, libraries, applications, scripts, or other logic or instructions for execution by a processing device, such as the circuitry 202. The AI model 204A may include code and routines configured to enable a computing device, such as the circuitry 202 to perform one or more operations for classification of one or more inputs (for example the trip details, the media consumption history, the user profile data, the device specification, the set of media content) into the recommended media content from the set of media content. Additionally or alternatively, the AI model 204A may be implemented using hardware including a processor, a microprocessor (e.g., to perform or control performance of one or more operations), a field-programmable gate array (FPGA), or an application-specific integrated circuit (ASIC). Alternatively, in some embodiments, the AI model 204A may be implemented using a combination of hardware and software.

Examples of the AI model 204A (such as the trained one or more neural network models) may include, but are not limited to, a deep neural network (DNN), a convolutional neural network (CNN), a recurrent neural network (RNN), a linear regression model, a logistic regression model, a decision tree model, a K-means based model, or a random forest model.

The I/O device 208 may include suitable logic, circuitry, and interfaces that may be configured to receive an input from a user and provide an output based on the received input. The I/O device 208 which may include various input and output devices, may be configured to communicate with the circuitry 202. Examples of the I/O device 208 may include, but are not limited to, a touch screen, a keyboard, a mouse, a joystick, a microphone, a display device, and a speaker.

The network interface 206 may include suitable logic, circuitry, code, and/or interfaces that may be configured to facilitate communication between the circuitry 202, the MaaS network 104, the plurality of MP servers 106, and the plurality of display devices, via the communication network 108. The network interface 206 may be implemented by use of various known technologies to support wired or wireless communication of the system 102 with the communication network 108. The network interface 206 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 206 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), a 5th generation network such as 5G new radio (NR) network, a 5G smart antenna, time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS). The network interface 206 may be capable to communicate with a 5G communication network and will include appropriate 5G support functionality such as, but not limited to, a 5G NR, a V2X Infrastructure, and a 5G Smart Antenna.

FIG. 3 is a block diagram that illustrates exemplary operations for a playback control of media content across devices in a MaaS transportation network, in accordance with an embodiment of the disclosure. FIG. 3 is described in conjunction with elements from FIGS. 1 and 2. With reference to FIG. 3, there is shown a block diagram 300 that illustrates exemplary operations from 302 to 338, as described herein. The exemplary operations illustrated in the block diagram 300 may start at 302 and may be performed by any computing system, apparatus, or device, such as by the system 102 of FIG. 1 or FIG. 2. Although illustrated with discrete blocks, the exemplary operations associated with one or more blocks of the block diagram 300 may be divided into additional blocks, combined into fewer blocks, or eliminated, depending on implementation of the exemplary operations.

At 302, trip details may be received. In an embodiment, the circuitry 202 may be configured to receive, from the MaaS network 104, trip details associated with an ongoing trip of the user 114. In an embodiment, the received trip details may include context factors associated with the ongoing trip of the user 114. Examples of the trip details associated with the ongoing trip of the user 114 may include, but are not limited to, information corresponding to a source and a destination of the ongoing trip, a duration of the ongoing trip, information associated with one or more legs of the ongoing trip, a duration of each leg of the ongoing trip, at least one transportation service provider associated with the ongoing trip, and details of the plurality of vehicles to be used in the ongoing trip. For example, such details may include a type of vehicle or a mode of transport associated with each vehicle and a type of transport service (private or public) associated with each vehicle. In some instances, such details may also specify if a vehicle includes an in-built display for entertainment or not.

At 304, a media consumption history may be received. In an embodiment, the circuitry 202 may be configured to receive, from the MaaS network 104, the media consumption history associated with the user 114. Examples of the media consumption history may include, but are not limited to, a log which lists user's viewing history of programs or shows, games, or other interactive content, a past viewing history of media content genres, a type of media content consumed over past trips, and a particular time or media content consumption in the past (such as a time of the day at home) or at a particular destination (such as in a vehicle or at home). The type of media may include, for example, audio content, video content, an audio-view content associated with a particular genre of the media content, an audio-view content associated with a preferred content length, a game content, a Virtual Reality (VR) or an Augmented Reality (AR) content, an immersive 3D video, and the like.

At 306, a user profile may be received. In an embodiment, the circuitry 202 may be configured to receive, from the MaaS network 104, the user profile of the user 114. The user profile may include, for example, content preferences of the user 114 and other details, such as user's name, age group, or other demographic factors, such as income group to which the user 114 belongs to. In an embodiment, the user profile may include details of travel locations typically covered in a trip of the user 114, a type of media content preferred by the user 114, a type of vehicle preferred by the user 114, a type of account (such as a paid subscription account) of the user 114, and behavioral datapoints on the user 114.

At 308, a device specification may be received. In an embodiment, the circuitry 202 may be configured to receive, from the MaaS network 104, the device specification associated with the first display device 110A. The device specification may include, for example, a model name of the first display device 110A, a screen size of the first display device 110A, and one or more compatible media formats associated with the first display device 110A.

At 310, a context-aware recommendation model may be loaded in the memory 204. The context-aware recommendation model may be trained on a media content recommendation task. For example, the context-aware recommendation model may be a classifier model which may be trained to generated a set of media content recommendations that may match with features extracted from one or more of the trip details, the user profile, the media consumption history, and the device specification. In an embodiment, the AI model 204A may be used as the context-aware recommendation model.

In an embodiment, the context-aware recommendation model may be implemented as a machine learning model. Examples of the machine learning model may include, but are not limited to, a regression model (such as a multivariate logistic or linear regression model), a decision tree model, a random forest, a gradient boosted tree, or a Naive Bayes.

In another embodiment, the context-aware recommendation model may be implemented as a Neural Network (NN) model. The NN model may be defined by its hyper-parameters, for example, a number of weights, a cost function, an input size, a number of layers, a number or neurons per layer, and the like. In training stage, the hyper-parameters of the context-aware recommendation model may be tuned, and weights may be updated so as to move towards a global minimum of the cost function. After several epochs of the training on a training dataset, the context-aware recommendation model may be trained to output a prediction/classification result for a set of inputs. The prediction result may be indicative of a class label (a media content recommendation) for each input of the set of inputs (e.g., input features extracted from new/unseen instances).

The context-aware recommendation model may include electronic data, such as, for example, a software program, code of the software program, libraries, applications, scripts, or other logic or instructions for execution by a processing device, such as the circuitry 202. The context-aware recommendation model may include code and routines configured to enable a computing device, such as the circuitry 202 to perform one or more operations for classification of one or more input into the set of recommendations. Additionally or alternatively, the trained context-aware recommendation model may be implemented using hardware including a processor, a microprocessor (e.g., to perform or control performance of one or more operations), a field-programmable gate array (FPGA), or an application-specific integrated circuit (ASIC). Alternatively, in some embodiments, the trained context-aware recommendation model may be implemented using a combination of hardware and software. In certain embodiments, the context-aware recommendation model may be based on a hybrid architecture of multiple Deep Neural Networks (DNNs).

At 312, a set of recommendations may be generated. In an embodiment, the circuitry 202 may be configured to generate a set of media content recommendations based on the received trip details and the media consumption history associated with the user 114. The generated set of recommendations may include, but not limited to, recommendations associated with a type of media content preferred by the user 114, a genre of the media content based on a previously played media content, or a media content to be resumed. In an embodiment, the circuitry 202 may be further configured to generate the set of media content recommendations further based on the received user profile and the device specification. As an example, the generated set of media content recommendations may be related to media content, such as, but not limited to, thriller and horror shows. Such shows may be related to the genres or programs mentioned in the media consumption history or in the user profile.

In an embodiment, at least one of the generated set of media content recommendations may be generated based on a genre or a media program which may be popular among a particular group of users, for example, users within a particular age group. In another embodiment, at least one of the set of media content recommendations may be generated based on preferences of other users with similar interest or a similar user profile as compared to that of the user 114.

In an embodiment, the circuitry 202 may construct an input feature for the context-aware recommendation model. The input feature may be constructed based on one or more of: the received trip details, the received media consumption history, the received user profile, or the received device specification. Thereafter, the circuitry 202 may input the constructed input feature to the context aware recommendation model (trained) and may generate the set of recommendations as an output of the context-aware recommendation model for the input feature.

For example, the trip details may include information associated with a duration of an ongoing trip of the user 114 and one or more vehicles with which the user 114 may travel. The trip details may further include a trip status (such as an identifier to indicate an active leg of the ongoing trip) associated with the ongoing trip. The media consumption history of the user 114 may indicate user's preference for various content genres (such as thriller or horror), preferred content formats (such as audio podcasts, Video-On-Demand (VOD) programs, or broadcast media content). Further, the media consumption history of the user 114 may list a set of shows that the user 114 may have previously watched in past trips.

The device specification of a display device (e.g., the first display device 110A or a personal mobile device (e.g., the display device 116 of the user 114) may include, for example, screen size information, a set of supported display resolutions, and a media format compatibility (such as in terms of a supported codec). Media content, related to a media content recommendation, may be compliant with the device specifications (e.g., a compatible screen resolution and media format).

At 314, model validation metrics may be generated. In an embodiment, the circuitry 202 may be configured to generate the model validation metrics. The model validation metrics may provide a quantitative measure of an accuracy with which the context-aware recommendation model may output a media content recommendation for a given input to the context-aware recommendation model. As an example, the circuitry 202 may be configured to receive a user input indicative of a selection of the context-aware recommendation model. Based on the user input, the circuitry 202 may be configured to validate the context aware recommendation model. The model validation metrics may enable a selection of the context aware recommendation model from various recommendation models which may be pre-trained for the media content recommendation task. For example, such metrics may include a confusion matrix to describe a performance of a recommendation model on test data.

At 316, an active first leg may be determined. In an embodiment, the circuitry 202 may be configured to determine the active first leg of the ongoing trip. The ongoing trip may be divided into legs which may have to be covered through a plurality of vehicles (e.g., a plurality of vehicles 112A, 112B . . . 112N) of at least one transportation service provider associated with the MaaS network 104. The plurality of vehicles may include a first vehicle (e.g., the first vehicle 112A) and a second vehicle (e.g., the second vehicle 112B).

At 318, the first vehicle may be determined. In an embodiment, the circuitry 202 may be configured to determine the first vehicle by which the user 114 may be set to complete the active first leg of the ongoing trip.

At 320, a first display device (e.g., the first display device 110A) may be controlled. In an embodiment, the circuitry 202 may be configured to control the first display device 110A to display the generated set of media content recommendations. The first display device 110A may be in use inside the determined first vehicle 112A within a duration of the active first leg. Examples of the first display device 110A may include, but are not limited to, a dashboard display of the first vehicle 112A, a rear seat entertainment device of the first vehicle 112A, a headrest display of the first vehicle 112A, or a personal mobile device (e.g., the display device 116) of the user 114. As an example, the first display device 110A may be controlled through a user interface (UI) of the personal mobile device (e.g., the display device 116), in case the first display device 110A may be connected to the personal mobile device.

At 322, a recommendation may be selected. In an embodiment, the circuitry 202 may be configured to receive a user selection of a first media content recommendation of the displayed set of media content recommendations. In an embodiment, the context-aware recommendation model may be re-trained based on the selection of the first media content.

At 324, a transport stream may be generated. In an embodiment, the circuitry 202 may be configured to generate the transport stream to include first media content associated with the first media content recommendation. In an embodiment the circuitry 202 may be configured to generate the transport stream (including the first media content) based on the device specification of the first display device 110A.

At 326, data stream chunking may be performed. In an embodiment, the circuitry 202 may be configured to execute a data stream chunking operation to generate a series of chunks of the generated transport stream. Each chunk of the generated series of chunks may not overlap with other chunks of the generated series of chunks. The series of chunks may be generated in a manner that the generated transport stream can be cached on a predicted edge network (such as an edge device associated with a base station of a mobile wireless network) to which the first display device 110A may be likely to connect within the duration of the ongoing trip.

In an embodiment, the circuitry 202 may be configured to store the generated series of chunks on a media server 328. The media server 328 may control the playback of the first media content associated with the first media content recommendation on the first display device 110A.

At 330, an event-based playback may be controlled. In an embodiment, the circuitry 202 may be configured to detect, within a duration of the ongoing trip, a first event which may require the playback of the first media content on the first display device 110A to pause. Examples of the detected first event may include, but are not limited to, an end of a trip leg, an end of a trip, a pause of the media content based on a user-input, or a user turning his/her head or eyes away from the first display device 110A. In an embodiment, the circuitry 202 may be further configured to control the playback of the first media content to pause on the first display device 110A based on the detection of the first event.

At 332, a media content identifier (ID) and a play/resume ID may be stored. In an embodiment, the circuitry 202 may be configured to determine, within a full duration of the first media content, a timestamp at which the playback of the first media content may be paused based on the detected event. The circuitry 202 may be further configured to store the media content ID (e.g., a track ID that may identify the first media content and also provide a location, such as, a Uniform Resource Locator (URL) of the first media content) in the distributed ledger sub-nodes 128 (e.g., the document sub-node 128C and the user sub-node 128B). Further, the circuitry 202 may record the timestamp as a play/resume ID on a database such as, the distributed ledger sub-nodes 128 (e.g., the document sub-node 128C). The circuitry 202 may also store a user ID associated with the user 114 in the distributed ledger sub-nodes 128 (e.g., the document sub-node 128C) along with the media content ID and the play/resume ID.

At 334, a (active) second leg may be determined. In an embodiment, the circuitry 202 may be configured to determine the second leg of the ongoing trip. In one scenario, the second leg may belong to the same trip as that of the first active leg. In another scenario, the second leg may belong to another trip different from the ongoing trip. It should be noted that the second leg may or may not immediately succeed the first active leg.

At 336, the second vehicle (e.g., the second vehicle 112B) may be determined. In an embodiment, the circuitry 202 may be configured to determine the second vehicle 112B by which the user 114 may be set to complete the second leg of the ongoing trip or of a different trip.

At 338, a second display device (e.g., the second display device 110B) may be controlled. In an embodiment, the circuitry 202 may be configured to control the second display device 110B to display the generated set of media content recommendations. The second display device 110B may be in use inside the determined second vehicle 112B within a duration of the second leg. Examples of the second display device 110B may include, but are not limited to, a dashboard display of the second vehicle 112B, a rear seat entertainment device of the second vehicle 112B, a headrest display of the second vehicle 112B, a personal mobile device (e.g., the display device 116) of the user 114.

In an embodiment, the circuitry 202 may be configured to control, based on the detected first event, the first display device 110A to display a first option to pause the playback of the first media content on the first display device 110A and resume the playback on the second display device 110B in the second leg. In an embodiment, the circuitry 202 may be configured to receive a first user input which includes a selection of the displayed first option. In such a case, the playback of the first media content may be controlled to resume on the second display device 110B further based on the received first input. Additionally, the playback of the first media content may be controlled to resume from the recorded timestamp (on the distributed ledger sub-nodes 128 (e.g., the document sub-node 128C) on the second display device 110B.

In an embodiment, the circuitry 202 may be configured to control a second display device (e.g., the display device 116)

to display a second option to resume the playback of the first media content based on a determination that the second vehicle 112B lacks an in-vehicle display. In such a case, the second display device may be a personal mobile device (e.g., the display device 116) of the user 114. The circuitry 202 may be configured to receive a second user input which includes a selection of the second option. The playback of the first media content may be controlled to resume from the recorded timestamp on the second display device (e.g., the display device 116) further based on the received second input.

FIG. 4 is a block diagram that illustrates an exemplary network environment for transmission of chunks of media content to a display device for seamless playback of the media content, in accordance with an embodiment of the disclosure. FIG. 4 is described in conjunction with elements from FIGS. 1, 2 and 3. With reference to FIG. 4, there is shown a network environment 400. The network environment 400 includes the system 102, a virtual network operator 402, and an infrastructure provider 404. The network environment 400 may further include a virtual network 406, including a first base station 408A and a second base station 408B, an edge computing device 410, and the first display device 110A. The infrastructure provider 404 may manage infrastructure of a mobile wireless network 412, such as 4th Generation or a 5th Generation mobile network.

The virtual network operator 402 may be a network operator that may resell network services and may not own or operate a telecom infrastructure. The virtual network operator 402 may provide the network services based on a license of bandwidths at wholesale rates from telecom providers. The virtual network operator 402 may have one or more associated network devices that may include suitable logic, circuitry, code, and/or interfaces to execute operations of the virtual network operator 402. The virtual network operator 402 may be configured to receive a service requirement that may be transmitted by the system 102. The received service requirement may include a Quality of Service (QoS) requirement and a set of mobility network management functions. The QoS requirement may include, for example, but not limited to, a 100 Megabits per Second (Mbps) bandwidth, a 10 milliseconds maximum latency, 1 millisecond maximum jitter and less than 1 second of recovery time. The set of mobility network management functions may include information related to, but not limited to, mobility context management, location tracking, paging, reachability management, handover control, mobility anchoring, and path optimization.

The virtual network operator 402 may transmit, based on the received service requirement, a network resource request to the infrastructure provider 404 associated with the mobile wireless network 412 (such as a 5G telecom network). The virtual network operator 402 may perform analytics using the received service requirement and transmit the network resource request to the infrastructure provider 404. For example, the virtual network operation 402 may perform the analytics to determine amount of network resources (e.g., bandwidth, network channels, and network slices) which may be utilized for the communication of media content from the system 102 to any display device (such as the first display device 110A).

The infrastructure provider 404 may manage network resources of the mobile wireless network 412 (such as a 5G telecom network). The infrastructure provider 404 may include one or more associated network devices that may include suitable logic, circuitry, code, and/or interfaces configured to perform operations of the infrastructure provider 404. The infrastructure provider 404 be configured to receive the network resource request from the virtual network operator 402. A resource controller of the infrastructure provider 404 may be configured to serve the received network resource request and create the virtual network 406 to allocate network resources of the mobile wireless network 412 (such as a 5G telecom network) in accordance with the service requirement in the received network resource request. The infrastructure provider 404 may allocate a new resource for the service requirement or may adjust an existing resource for the service requirement. Thus, the created virtual network 406 may cater to the needs of resource allocation.

As part of a network slicing feature of the mobile wireless network 412, the virtual network 406 of the mobile wireless network 412 (such as a 5G telecom network) may provide end-to-end customization capabilities to support diverse requirements for applications, such as, large data management on the MaaS network 104 associated with the plurality of transportation service providers. Moreover, a mobility-driven network slicing of the mobile wireless network 412 (such as a 5G telecom network) may support multiple network slices with different mobility management schemes. The mobility management schemes may be determined by an actual required level of a mobility support from the mobile wireless network 412 (such as a 5G telecom network). The mobility management schemes may be obtained by orchestrating selected mobility management elementary functions. The virtual network 406 may be configured to ensure delivery of infotainment application services to display devices (such as the first display device 110A) which may be used while in motion inside vehicles (such as the first vehicle 112A) on a predicted route of a trip (booked and managed through the MaaS network 104).

Each of the first base station 408A and the second base station 408B may include suitable logic, circuitry, code, and/or interfaces for a radio signal transmission and reception. Each of the first base station 408A and the second base station 408B may be a hub for a local wireless network and/or a gateway between a wired network and a wireless network (e.g., a cellular network). Each of first base station 408A and the second base station 408B may be configured to transmit media content (e.g., the first media content) to a connected display device (such as the first display device 110A) via the virtual network 406.

The edge computing device 410 may include suitable logic, circuitry, and/or interfaces that may be configured to cache chunks of a transport stream of the first media content before such chunks are transmitted to the first display device 110A for a playback of a portion of the first media content on the first display device 110A. Such chunks may be cached in advance before a handover of a network of the first display device 110A occurs from the first base station 408A to the second base station 408B. The edge computing device 410 may receive such chunks of the first media content from the system 102, via the virtual network 406.

The edge computing device 410 may include a computing device that may have a storage capability and may be connected to a network (e.g., an edge network). The edge network may include a plurality of switch or gateway devices that may be located at an entry or exit point between networks and may have a computing capability to process or store information from connected devices, such as, the edge computing devices 410. Details associated with caching of chunks and transmission of cached chunks to the first display device 110A are described, for example, in FIG. 5.

The mobile wireless network 412 (such as a 5G telecom network) may be an ultra-dense wireless telecom network that may include a large number of base stations. This may lead to frequent handovers, higher handover delays and thereby communication failures that may affect an overall service quality of the mobile wireless network 412. In an embodiment, a Mobility Management as a Service (MMaaS) for the MaaS network 104 may reduce the communication failures by use of the trip route information of ongoing trips associated with the MaaS network 104 and application needs of the system 102, to configure a handover policy. For example, the virtual network 406 may configure the handover policy by a dynamic adjustment of one or more Handover Control Parameters (HCP) based on trip route information of an active first leg of the ongoing trip of the user 114.

In an embodiment, the broker node device 120 (that may be associated with an intelligent broker of the MaaS network 104) may be configured to determine a certain message routing policy for transaction messages of the MaaS network 104 by calculation of a probability-based score associated with various factors that may influence transaction processing by the MaaS network 104. Thus, a selection of the message routing policy may be based on the calculated probability-based score that may be a tradeoff of the various factors associated with the transaction processing of the MaaS network 104. Examples of such factors may include, but are not limited to, a systemic risk mitigation for the MaaS network 104, remediation of operational and system troubles associated with the nodes of the MaaS network 104, cost benefits (e.g., price and/or user preference based benefits) to users of the MaaS network 104, and cost benefits to mobility providers and/or to organizations which run the MaaS network 104. Examples of such factors may further include, but are not limited to, traffic optimization associated with mobility providers of the MaaS network 104, energy consumption and carbon emissions associated with the vehicles 112A, 112B . . . 112N of the mobility providers of the MaaS network 104, and user time consumption associated with transactions of the MaaS network 104. In an embodiment, the virtual network 406 may further configure the handover policy based on the selected message routing policy of the broker node device 120. As discussed, the selected message routing policy may be based on the calculated probability-based score that may be a tradeoff between the various aforementioned factors.

Figure 5:
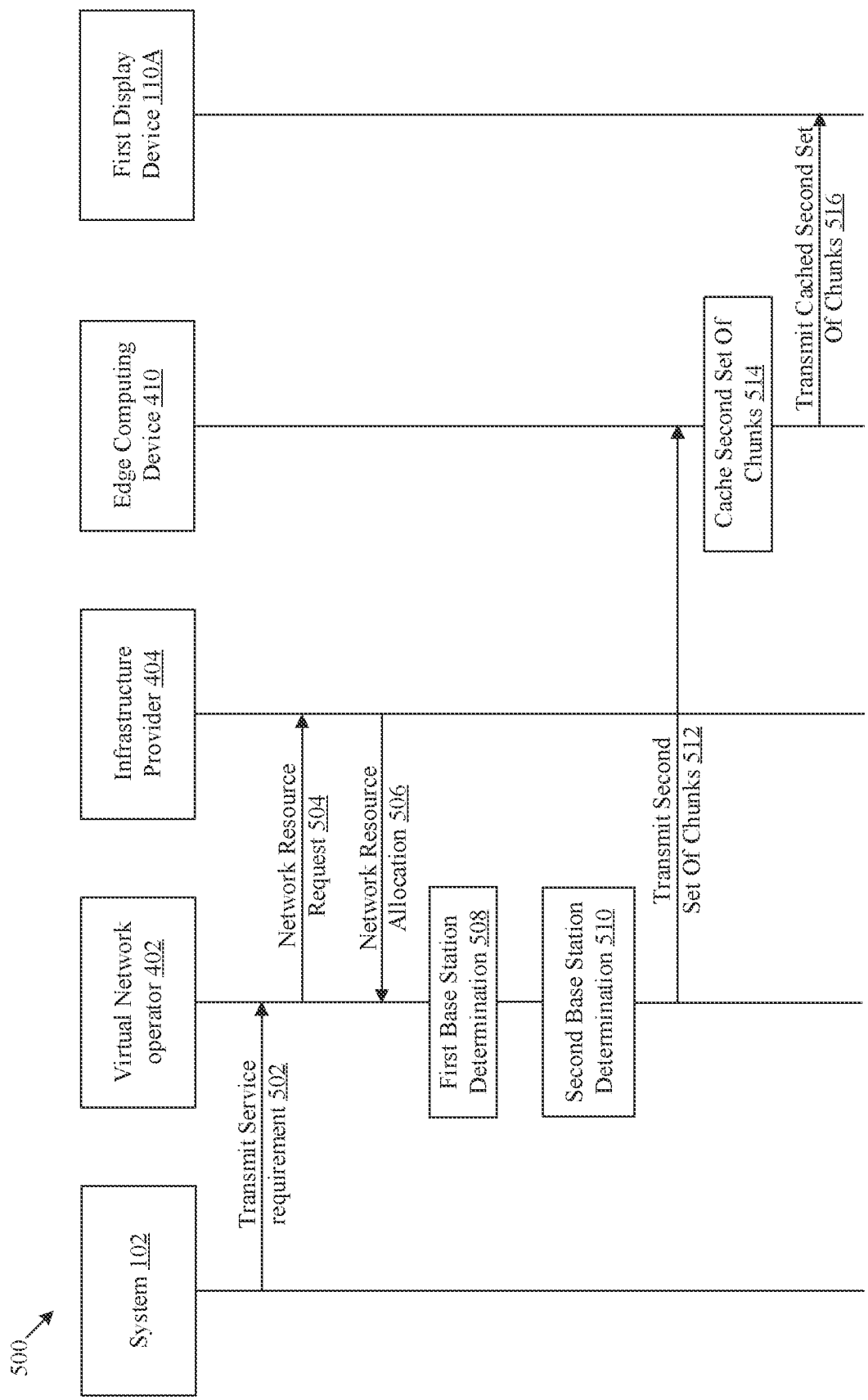
FIG. 5 is a sequence diagram that illustrates exemplary operations for transmission of chunks of transport stream of media content to a display device for playback of the media content, in accordance with an embodiment of the disclosure.

FIG. 5 is a sequence diagram that illustrates exemplary operations for transmission of chunks of transport stream of media content to a display device for playback of the media content, in accordance with an embodiment of the disclosure. FIG. 5 is described in conjunction with elements from FIGS. 1, 2, 3, and 4. With reference to FIG. 5, there is shown a sequence diagram 500 to depict exemplary operations from 502 to 520. The exemplary operations illustrated in the sequence diagram 500 may start at 502 and may be performed by any computing system, apparatus, or device, such as by the system 102 of FIG. 1 or FIG. 2, the virtual network operator 402, the infrastructure provider 404, the virtual network 406, and the edge computing device 410.

At 502, a service requirement may be transmitted. In an embodiment, the circuitry 202 may be configured to transmit the service requirement to the virtual network operator 402. In an embodiment, the virtual network operator 402 may be configured to receive the transmitted service requirement. The service requirement may include a Quality of Service (QoS) requirement and a set of mobility network management functions. The QoS requirement may include, for example, but not limited to, a 100 Megabits per Second (Mbps) bandwidth, a 10 milliseconds maximum latency, 1 millisecond maximum jitter, and less than 1 second of recovery time. The set of mobility network management functions may include information related to, but not limited to, mobility context management, location tracking, paging, reachability management, handover control, mobility anchoring, and path optimization. In an embodiment, the service requirement may be for transmission of the first media content from the system 102 to a display device, such as the first display device 110A via a 5G telecom network.

At 504, a network resource request may be transmitted. In an embodiment, based on the received service requirement, the virtual network operator 402 may be configured to transmit the network resource request to the infrastructure provider 404 associated with the mobile wireless network 412 (such as the 5G telecom network). In an embodiment, the virtual network operator 402 may perform analytics on the received service requirement and may generate the network resource request based on the analytics.

At 506, network resources may be allocated. In an embodiment, the infrastructure provider 404 may be configured to create the virtual network 406 to allocate the network resources of the mobile wireless network 412 (such as, the 5G telecom network, e.g., the communication network 108) in accordance with the service requirement. The allocation of the network resources is described further, for example, in FIG. 4.

At 508, the first base station 408A may be determined. In an embodiment, the created virtual network 406 may be configured to determine, within the duration of the ongoing trip, the first base station 408A of the mobile wireless network 412 to which the first display device 110A may be connected to stream a first set of chunks of the stored series of chunks from the media server 328 for a playback on the first display device 110A. As an example, the virtual network 406 may store location information of a plurality of base stations associated with the virtual network 406. The virtual network 406 may receive a current location of the first vehicle 112A in which the first display device 110A may be in use. In an embodiment, the current location of the first vehicle 112A may be received from the first MP server 106A. Based on the stored location information of the plurality of base stations and the received current location of the first vehicle 112A, the virtual network 406 may be configured to determine the first base station 408A with which the first display device 110A may be currently connected to stream the first set of chunks.

At 510, the second base station 408B may be determined. In an embodiment, based on trip route information associated with the ongoing trip, the created virtual network 406 may be configured to determine the second base station 408B of the mobile wireless network 412 (such as a 5G telecom network) to which the first display device 110A may be likely to connect after a handover from the first base station 408A. In an embodiment, the virtual network 406 may receive the trip route information associated with the ongoing trip from the system 102. Based on the stored location information of the plurality of base stations and the received trip route information, the virtual network 406 may be configured to determine the second base station 408B.

At 512, a second set of chunks may be transmitted. In an embodiment, before the handover, the created virtual network 406 may be configured to transmit the second set of chunks of the stored series of chunks to the edge computing device 410 associated with the second base station 408B.

At 514, the second set of chunks may be cached. In an embodiment, before the handover, the edge computing device 410 may be configured to receive the transmitted second set of chunks and cache the received second set of chunks.

At 516, the cached second set of chunks may be transmitted. In an embodiment, after the handover, the edge computing device 410 may be configured to transmit the cached second set of chunks to the first display device 110A for the playback of a portion of the first media content on the first display device 110A.

As described, the edge computing device 410 may predictively cache a portion of the first media content (such as the second set of chunks of the media stream) before handover to a next base station. After a handover to the next base station, the edge computing device 410 may transmit the cached portion of the first media content to a display device (e.g., the first display device 110A). Thus, the communication failures likely during handovers between base stations may be reduced and media content delivery may be optimized by predictive caching of a portion of the first media content at the edge computing device 410. The above-mentioned process may be repeated to cache other portions of the first media content in advance to other base stations to which the first display device 110A may be likely to connect with the duration of the active first leg of the ongoing trip. By use of the configured handover policy and the edge computing device 410, the first media content may be seamlessly streamed to any display device in use within the duration of the ongoing trip.

In certain scenarios, the first media content or a portion of the first media content (such as a set of cached chunks of the media stream) may be stored on the second vehicle 112B or a display device (e.g., the second display device 110B) inside the second vehicle 112B, and further, the second vehicle 112B may be in a physical proximity of the first vehicle 112A. In such cases, the first display device 110A and the second display device 110B may establish a communication link between each other through, for example, an Internet-of-Things (IoT) network (such as, a Vehicle-to-Vehicle (V2V) network or a Vehicle-to-Everything (V2X) network). Thus, the first display device 110A may receive the first media content or the set of cached chunks of the media stream from the second vehicle 112B or the second display device 110B. This may be useful in cases of handovers (e.g., in 5G cellular networks) or lack of network bandwidth. Similarly, through the IoT network (such as, the V2V network or the V2X network), the first display device 110A may also receive other media content which may have been cached or previously streamed on the second display device 110B inside the second vehicle 112B.

Figure 6:
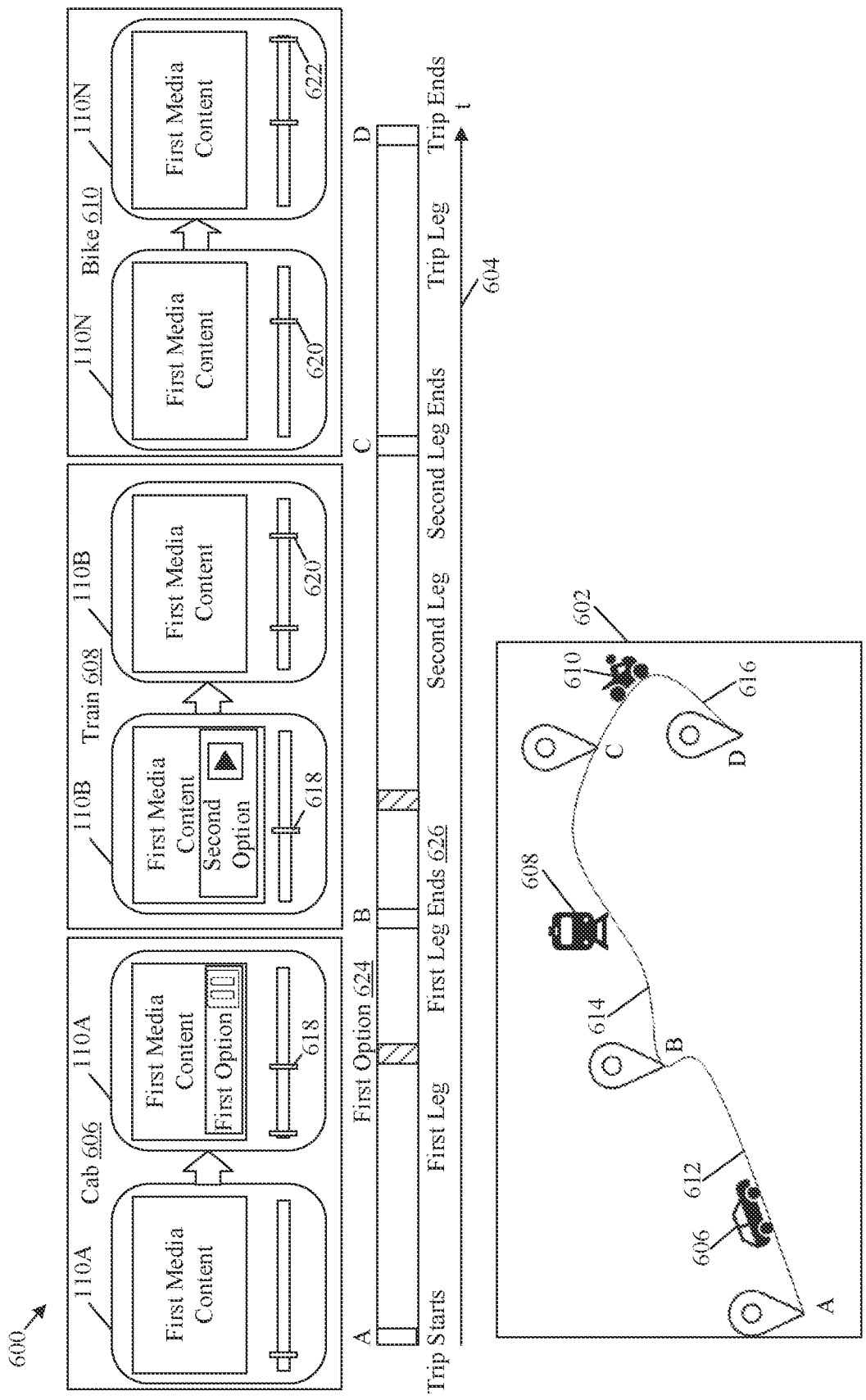
FIG. 6 is a diagram that illustrates an exemplary scenario for a playback control of media content across devices in a MaaS transportation network, in accordance with an embodiment of the disclosure.

FIG. 6 is a diagram that illustrates an exemplary scenario for a playback control of media content across devices in a MaaS transportation network, in accordance with an embodiment of the disclosure. FIG. 6 is explained in conjunction with elements from FIGS. 1, 2, 3, 4, and 5. With reference to FIG. 6, there is shown a scenario 600. The scenario 600 may include a representation 602 of an ongoing trip of the user 114, and a timeline 604 of the ongoing trip.

The ongoing trip may start from a source location A and end at a destination location D. The ongoing trip may be divided into three legs such as a first leg 612 (between the source location A and a first intermediate location B), a second leg 614 (between the first intermediate location B and a second intermediate location C), a third leg 616 (between the second intermediate location C and the destination location D). The three legs may be covered through a plurality of vehicles of at least one transportation service provider associated with the MaaS network 104. The plurality of vehicles may include a cab 606, a train 608, and a bike 610.

Within a duration of the active first leg 612, the circuitry 202 may display a set of media content recommendations on the first display device 110A while the first display device 110A is in use inside the cab 606. At any time-instant with the duration of the active first leg 612, the circuitry 202 may receive a user selection of a first media content recommendation of the displayed set of media content recommendations. Thereafter, the circuitry 202 may control a playback of first media content associated with the first media content recommendation on the first display device 110A.

In certain scenarios, the set of media content recommendations may include media content that may be stored on or streaming on the display device 116 of the user 114 prior to the start of the active first leg 612. In case the media content has been played back up to a certain timestamp on the display device 116 of the user 114 prior to the start of the active first leg 612, the circuitry 202 may control the first display device 110A to prompt the user 114 to resume a playback of the media content from the same timestamp on the first display device 110A. In another scenario, the circuitry 202 may control the display device 116 to display the set of media content recommendation on the display device 116 even prior to the start of the first active leg 612 (for example, while the user 114 waits for the cab 606) or within a duration between two legs of a trip (such as when the user 114 waits to start a second leg of a trip after the first active leg 612 ends). Based on the selection of the first media content received from the user 114, the circuitry 202 may control the playback of the first media content on the display device 116. The playback of the first media content on the display device 116 may pause at a certain timestamp on start of the first leg 612 and the circuitry 202 may control the playback of the first media content to resume on the first display device 110A from the paused timestamp.

Within the duration of the ongoing trip, the circuitry 202 may detect a first event which may require the playback of the first media content to pause. The first event may include a user input (for example, a selection of a first option 624 on the first display device 110A) to pause the playback of the first media content. The circuitry 202 may determine, within a full duration of the first media content, a first timestamp 618 at which the playback of the first media content may be paused based on the detected first event. The first media content may be paused and the circuitry 202 may record the first timestamp 618 on the distributed ledger sub-nodes 128 (e.g., the document sub-node 128C).

In an embodiment, the first display device 110A may include an image capture device. By use of the image capture device, the first display device 110A may capture a plurality of images of the user 114 while the user 114 may be watching the first media content on the first display device 110A. The first display device 110A may apply a gaze estimation technique to track a movement of a line-of-sight (LoS) of the user 114 in each of the plurality of images of the user 114. The LoS may include a pose of the head and an orientation of eyes of the user 114 with respect to a reference position. Based on the tracking of the LoS, the first display device 110A may determine whether the user 114, at any time-instant, is facing the first display device 110A or not. In certain scenarios, based on the pose of the head and the orientation of the eyes of the user 114 with respect to the reference position and also a detection of a mobile phone near ear or mouth of the user 114 in the plurality of images of the user 114, the first display device 110A may detect that the user 114 may be on a call. In case the first display device 110A determines the LoS to be away from the first display device 110A, or in case the first display device 110A detects that the user 114 is on a call, the first display device 110A may auto-pause the playback of the first media content on the first display device 110A. In some scenarios, the first display device 110A may display the first option 624 to allow the user 114 to manually pause the playback of the first media content, when the first display device 110A detects that the LoS of the user 114 is away from the first display device 110A, or when the first display device 110A detects the user 114 is on a call. The first media content may be paused and the circuitry 202 may record the first timestamp 618 on the distributed ledger sub-nodes 128 (e.g., the document sub-node 128C).

In other scenarios, the first display device 110A may receive a user input from the user 114 to seek the first media content. For example, the user input may indicate an instruction to rewind, forward, or skip certain segments of the first media content or to navigate to a certain timestamp in the first media content. Based on the received user input, the first display device 110A may seek the first media content to a new content playback timestamp. The circuitry 202 may accordingly record, on the distributed ledger sub-nodes 128 (e.g., the document sub-node 128C), the timestamp corresponding to the new content playback timestamp (after the seek) as the first timestamp 618. Thus, a type of interruption in the playback of the media content may be suitably monitored. Examples of the types of interruptions of the media content playback may include, but are not limited to, an auto-pause or a manual pause of a playback of the media content due a user's lack of attention (e.g., when the user looks away from the first display device 110A or the user is on a call) or a manual seek of the playback of the media content.

In another embodiment, the broker node device 120 may determine failures of one or more transactions of the MaaS network 104 and predict a cause of failure of the one or more transactions. The failure of the one or more transactions may be indicative of a failure corresponding to a route associated with the one or more transactions. Examples of such predicted cause of failures may include, for example, a natural calamity (e.g., an earthquake, a tsunami, a cyclone, a storm, floods, or volcano eruption), a disaster (e.g., an accident on a major crossing, or a pandemic/epidemic), or traffic disruptions (e.g., protests/processions, traffic diversions due to an event/festival, or traffic jam in peak hours). The broker node device 120 may also determine alternate routes associated with the one or more transactions based on the determined failure of the one or more transactions and the predicted cause of failure. Based on the predicted cause of failure and the determined alternate routes, the circuitry 202 may control the first display device 110A to display a prompt to the user 114. The prompt may indicate that the current leg of the trip may be interrupted in a certain time (e.g., in a few minutes) due to the predicted cause of failure. The prompt may also indicate that the trip may be continued on a new leg of the alternate route. In such a case, the first display device 110A may be configured to auto-pause the playback of the first media content or allow the user 114 to manually pause the playback of the first media content. Again, the first media content may be paused and the circuitry 202 may record the first timestamp 618 on the distributed ledger sub-nodes 128 (e.g., the document sub-node 128C).

In an embodiment, after an end of the first leg 612 and before a beginning of the second leg 614 of the trip (for example, when the user 114 deboards from the cab 606 and waits for the train 608), the playback of the first media content may resume on the display device 116 of the user 114. The circuitry 202 may extract the first timestamp 618 from the distributed ledger sub-nodes 128 (e.g., the document sub-node 128C) and may control the display device 116 to resume the playback of the first media content from the extracted first timestamp 618. Further, the display device 116 may auto-pause the play back of the first media content or allow the user 114 to manually pause the playback of the first media content, prior to the start of second leg 614 (e.g., at a pre-determined time before the second leg 614 starts). The circuitry 202 may store a current timestamp associated with the playback of the first media content as the first timestamp 618 on the distributed ledger sub-nodes 128 (e.g., the document sub-node 128C).

Within a duration of the second leg 614 of the trip, the circuitry 202 may control the playback of the first media content to resume on the second display device 110B in use inside the train 608. At any time-instant within the duration of the second leg 614, the circuitry 202 may detect a second event which may require the playback of the first media content to resume. The second event may include a user input (for example, through a selection of a second option 626 on the second display device 110B) to resume the playback of the first media content. The circuitry 202 may retrieve the recorded first timestamp 618 from the distributed ledger sub-nodes 128 (e.g., the document sub-node 128C). The playback of the first media content may be resumed from the retrieved first timestamp 618 on the second display device 110B. Alternatively, the circuitry 202 may control the second display device 110B to prompt the user 114 to provide a user input indicative of a seek position in the first media content from which the user 114 may wish to resume the playback of the media content. Based on the user input indicative of the seek position, the playback of the first media content may be resumed on the second display device 110B.

Figure 7:
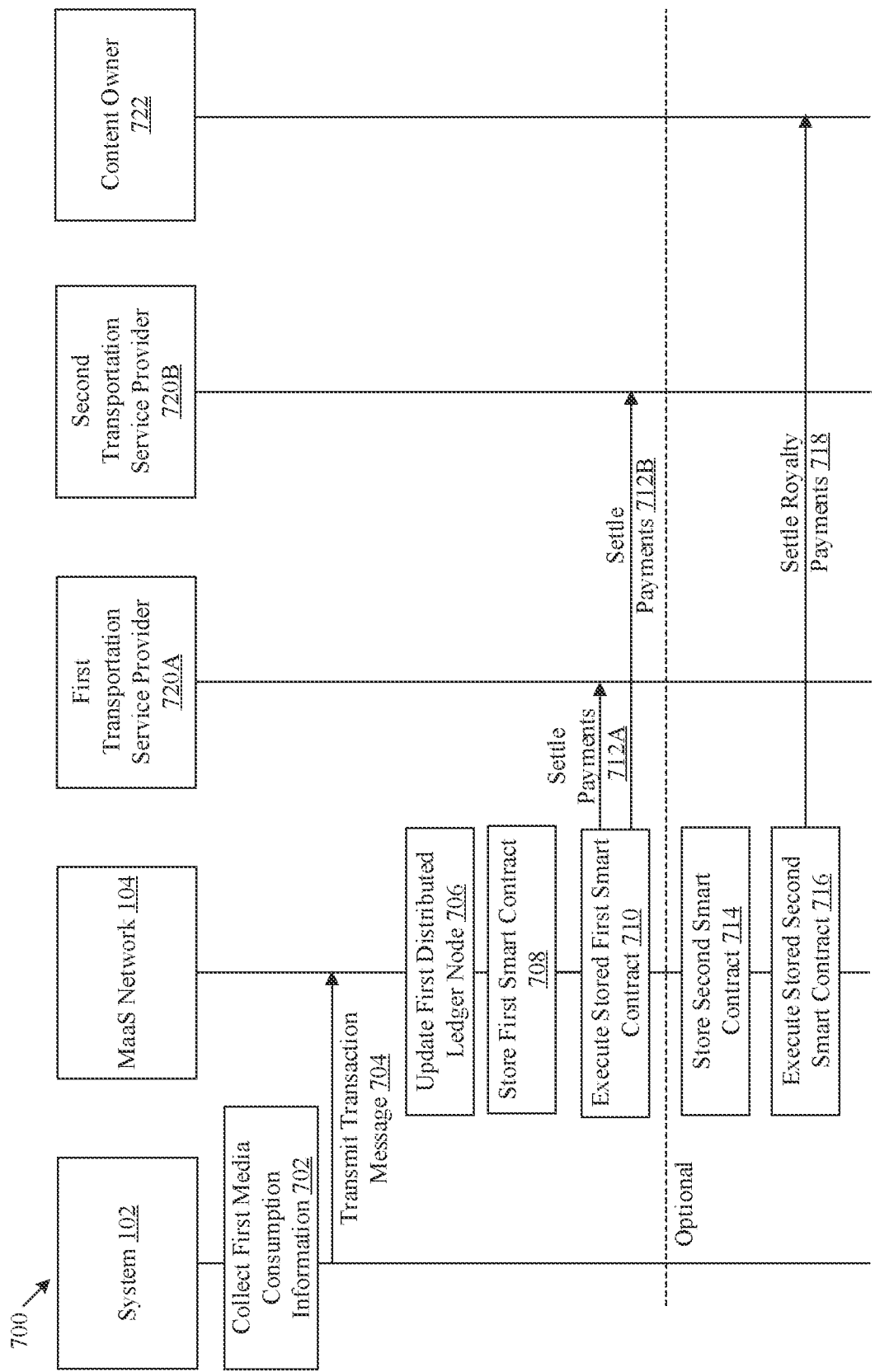
FIG. 7 is a sequence diagram that illustrates exemplary operations of the MaaS transportation network for a settlement of payments associated with media usage, in accordance with an embodiment of the disclosure.

In another embodiment, the circuitry 202 may be configured to receive a trip status associated with the ongoing trip from a first distributed ledger node (e.g., a first MaaS node, as shown in FIG. 7) of the MaaS network 104. The circuitry 202 may detect, based on the received trip status, the second event that may indicate that the user 114 may be onboard the second vehicle 112B (such as the train 608) to cover the second leg 614 of the ongoing trip. The circuitry 202 may retrieve the recorded first timestamp 618 from the distributed ledger sub-nodes 128 (e.g., the document sub-node 128C) based on the detected second event. The playback of the first media content may be controlled to resume from the retrieved first timestamp 618 on the second display device 110B.

The circuitry 202 may control the playback of the first media content to pause on the second display device 110B based on a determination of a third event that may be indicative of an end of the active second leg 614 of the ongoing trip. The circuitry 202 may determine, within a full duration of the first media content, a second timestamp 620 at which the playback of the first media content may be paused based on the detected third event. The playback of the first media content may be paused and the circuitry 202 may record the second timestamp 620 on the distributed ledger sub-nodes 128 (e.g., the document sub-node 128C).

In an embodiment, the circuitry 202 may control the second display device 110B to display a notification that the active second leg 614 of the ongoing trip may be about to end. This may alert the user 114 to disembark from the train 608.

Within a duration of the third leg 616 of the trip, the circuitry 202 may control a playback of the first media content on a display device (e.g., the Nth display device 110N) associated with the bike 610. As shown, the third leg 616 may be covered through the bike 610. In such a case, it may not be possible to view the first media content. The circuitry 202 may detect, within a duration of the ongoing trip, a fourth event which may require the playback of the first media content to resume on the Nth display device 110N. The fourth event may include, for example, a user input to resume the playback of audio content associated with the first media content.

The circuitry 202 may retrieve the recorded second timestamp 620 from the distributed ledger sub-nodes 128 (e.g., the document sub-node 128C). The playback of the first media content (i.e., the audio content of the first media content) may be resumed from the retrieved second timestamp 620 on the Nth display device 110N. The audio content may be played throughout the active third leg 616 of the ongoing trip. At any time-instant, the circuitry 202 may control the playback of the first media content (i.e. the audio content associated with the first media content) to pause on the Nth display device 110N based on a determination of a fifth event indicative of an end of the active third leg 616 of the ongoing trip or end of the trip. In another scenario, the fifth event may be indicative of a completion of the playback of the first media content (i.e., the audio content associated with the first media content). In an embodiment, the audio content may not be associated with the first media content. In such a case, the audio content may be, for example, a podcast, an audio book, a music or a song, or an audio portion of another video content.

In an embodiment, based on a determination that the Nth display device 110N associated with the bike 610 may play only audio content, the circuitry 202 may receive a user input from the user 114 to resume a playback of the first media content on the personal computing device (e.g., display device 116) of the user 114. For example, the display device 116 may have a capability to play both audio content and video content of the first media content. Based on the received user input to resume the playback on the display device 116, the circuitry 202 may control the display device 116 to resume the playback of the first media content from the recorded second timestamp 620. Therefore, the system 102 may allow seamless playback of the first media content across devices in the MaaS network 104.

In an embodiment, the circuitry 202 may receive media content playback settings associated with the playback of the first media content on the first display device 110A within a duration of the active first leg 612 of the ongoing trip. The media content playback settings may be received via a user input from the first display device 110A. Examples of the media content playback settings may include, but are not limited to, volume settings, display settings, and a playback speed. The circuitry 202 may store the received media content playback settings in the distributed ledger sub-nodes 128 (e.g., the document sub-node 128C and/or the user sub-node 128B). The circuitry 202 may retrieve the media content playback settings from the distributed ledger sub-nodes 128 (e.g., the document sub-node 128C and/or the user sub-node 128B), at start or within a duration of another leg (e.g., the second leg 614). When the first media content is played back on the second display device 110B, the retrieved media content playback settings may be configured on the second display device 110B. The circuitry 202 may control the playback of the first media content in accordance with the configured media content playback settings.

In an embodiment, a vehicle that the user 114 may board for a certain leg of the ongoing trip may have a display device that may be a part of a common infotainment system of the vehicle. For example, the first display device 110A may be a part of an infotainment system of the cab 606. The cab 606 may also include one or more display devices other than the first display device 110A. In some cases, the one or more display devices may also be a part of the same infotainment system of the cab 606. In case the user 114 has a subscription to watch the first media content through a priority subscription model (e.g., a premium membership with a content provider that may provide the first media content), the circuitry 202 may enable a priority access of the user 114 to the infotainment system amongst other users, if any, in the cab 606. In such a case, the circuitry 202 may control the playback of the first media content on the first display device 110A and may control one or more functionalities of the infotainment system.

In an embodiment, a ticket associated with the trip or a certain leg of the trip may include an offer, promotional scheme, or festive discount that may entitle the user 114 with an access to an audio/video service associated with the trip or the leg of the trip. In such a case, the user 114 may or may not be a subscriber of the audio/video service. The audio/video service may be pre-bundled with the ticket associated with the trip or the leg of the trip. The circuitry 202 may accordingly provide the audio/video service (e.g., a movie, a television series, or an online/web series) as one or more media content in the set of recommended media content that may be played back in a duration of the trip or the leg of the trip.

In an embodiment, the circuitry 202 may monitor a status of each of a plurality of display devices (e.g., the first display device 110A, the second display device 110B, and the Nth display device 110N, and the display device 116) that may be used within a duration of the ongoing trip. Based on the monitored status of each display device, the circuitry 202 may determine first monitoring information indicative of whether a display device of the plurality of display devices is non-functional. The first monitoring information may also indicate a duration for which the display device is unused. In certain scenarios, the circuitry 202 may process refunds or provide offers through the display device 116 based on the first monitoring information. This may lead to optimal display device usage and reduction of a user churn rate.

Though the second leg 614 and the third leg 616 are shown in FIG. 6 as legs of a single trip, the scope of the disclosure may not be so limited. In an embodiment, the second leg 614 and/or the third leg 616 may be legs of trip(s) which may be different from the trip associated with the first leg 612, without a departure from the scope of the disclosure. In FIG. 6, the first leg 612, the second leg 614, and the third leg 616 are shown as successive legs of a single trip. However, the present disclosure may not be so limiting, and in some embodiments, the second leg 614 may be any leg which succeeds the first leg 612, and the third leg 616 may be any leg which succeeds the second leg 614, without a departure from the scope of the disclosure.

FIG. 7 is a sequence diagram that illustrates exemplary operations of the MaaS transportation network for a settlement of payments associated with media usage, in accordance with an embodiment of the disclosure. FIG. 7 is explained in conjunction with elements from FIGS. 1, 2, 3, 4, 5, and 6. With reference to FIG. 7, there is shown a sequence diagram 700 to depict exemplary operations from 702 to 718. The exemplary operations illustrated in the sequence diagram 700 may start at 702 and may be performed by any computing system, apparatus, or device, such as by the circuitry 202 of the system 102 of FIG. 2, the MaaS network 104, a first transportation service provider 720A, a second transportation service provider 720B, and a content owner 722.

At 702, first media consumption information may be collected. In an embodiment, the circuitry 202 may collect, within the duration of the ongoing trip, the first media consumption information associated with the first media content on the first display device (e.g., the first display device 110A) and the second display device (e.g., the second display device 110B). The first media consumption information may include, but not limited to, an identifier (such as a title) of the first media content selected by the user 114 for playback, a duration of the playback of the first media content, and a number of times the first media content is viewed by the user 114. The first media consumption information may further include, but is not limited to, a type and device specification of each display device on which the first media content may be played and a number of times the playback of the first media content may be paused and resumed.

At 704, a transaction message may be transmitted. In an embodiment, the circuitry 202 may transmit the transaction message that may include the collected first media usage information to the MaaS network 104.

At 706, a first distributed ledger node may be updated. In an embodiment, the MaaS network 104 may be configured to receive the transmitted transaction message and may update a record on the first distributed ledger node (e.g., the first MaaS node 126A of the second distributed ledger 126) of the MaaS network 104. The record may be updated by an execution of a transaction on the first distributed ledger node (e.g., the first MaaS node 126A) based on the received transaction message. The updated record may consolidate media usage statistics associated with the first media content from all users who may have viewed the first media content within a given period.

At 708, a first smart contract may be stored. In an embodiment, the MaaS network 104 may store the first smart contract on the first distributed ledger node (e.g., the first MaaS node 126A). The first smart contract may store payment settlement rules that may be agreed upon by a provider of the MaaS network 104 and at least one transportation service provider (e.g., the first transportation service provider 720A and the second transportation service provider 720B) associated with the MaaS network 104.

For example, the payment settlement rules may include a scheduled automatic payment rule based on the media usage statistics. The scheduled automatic payment rule may be associated with a configurable settlement model including payment settlement schedules of different intervals such as, but not limited to, daily payment, weekly payment, bi-weekly payment, monthly payment, quarterly payment, or yearly payment. In some cases, such rules may include a share (% share) of revenue for each the provider of the MaaS network 104 and at least one transportation service provider (e.g., the first transportation service provider 720A and the second transportation service provider 720B). Such share may be determined based on, for example, a duration or a number of media views inside a vehicle of each transportation service provider.

The media usage statistics may be used to settle payments for usage of media content within a duration one or more trips managed by the MaaS network 104. Such payments may be settled among transportation service provider(s) and the provider of the MaaS network 104. The provider of the MaaS network 104 may have a pre-determined revenue distribution agreement with different transportation service providers associated with the MaaS network 104. The MaaS network 104 may settle payments based on the pre-determined revenue distribution agreement. For example, the MaaS network 104 may distribute 20% of a media usage revenue (determined based on a number of views and duration of each view) to the provider of the MaaS network 104. The MaaS network 104 may equally distribute the remaining of the media usage revenue amongst different transportation service providers. Alternatively, the MaaS network 104 may distribute the remaining of the media usage revenue amongst the transportation service providers in a ratio which may be proportional to a distance travelled by a user or a duration of travel logged with each transportation service provider. Alternatively, the MaaS network 104 may distribute the remaining of the media usage revenue to the transportation service providers in a ratio which may be proportional to a total duration of playback logged for a particular transportation service provider, a number of views logged for a particular transportation service provider, and/or a cost associated with the media content on a respective transportation service provider.

At 710, the stored first smart contract may be executed. In an embodiment, of the MaaS network 104 may execute the stored first smart contract on the first distributed ledger node (e.g., the first MaaS node 126A). By execution of the stored first smart contract, the provider of the MaaS network 104 may initiate settlement of a payment to at least one transportation service provider (e.g., the first transportation service provider 720A and the second transportation service provider 720B).

At 712A and 712B, payments may be settled. In an embodiment, the MaaS network 104 may be configured to settle the payments for the playback of the first media content with at least one transportation service provider (e.g., the first transportation service provider 720A and the second transportation service provider). The MaaS network 104 may settle the payments by execution of the stored first smart contract, based on the updated record (at 706) associated with the first media content, and the payment settlement rules that may be agreed upon by the provider of the MaaS network 104 and at least one transportation service provider.

At 714, a second smart contract may be stored. In an embodiment, the MaaS network 104 may store a second smart contract on the first distributed ledger node (e.g., the first MaaS node 126A of the second distributed ledger 126). The second smart contract may store royalty payment rules agreed upon by a provider of the MaaS network 104 and a content owner (e.g., the content owner 722) of the first media content. In an embodiment, the royalty payment rules may determine a royalty amount for the content owner 722 based on the media usage statistics. For example, the royalty amount may be determined as a price per view (in United States Dollars) times a total number of views of the first media content, which may be logged within a period on the MaaS network 104. In an embodiment, the royalty amount may be determined further based on engagement metrics, such as a total playtime or a number of interactions (such as a number of times the first media content is mentioned on social media platforms).

At 716, the stored second smart contract may be executed. In an embodiment, of the MaaS network 104 may be configured to execute the stored second smart contract on the first distributed ledger node (e.g., the first MaaS node 126A). By execution of the stored second smart contract, the provider of the MaaS network 104 may initiate settlement of a payment to the content owner 722 of the first media content.

At 714, royalty payments may be settled. In an embodiment, the MaaS network 104 may settle the royalty payments for the playback of the first media content with the content owner 722 of the first media content. The MaaS network 104 may settle the payments by execution of the stored second smart contract, based on the updated record associated with the first media content, and the royalty payment rules that may be agreed upon by the MaaS network 104 and the content owner 722.

The system 102 of the present disclosure may ensure effective monetization of media content by real-time allocation, distribution, and/or settlement of payments by use of smart contracts. The payments may include consumption-based payments to transportation service providers and the provider of the MaaS network 104, or royalty payments to content owners of media content.

Figure 8:
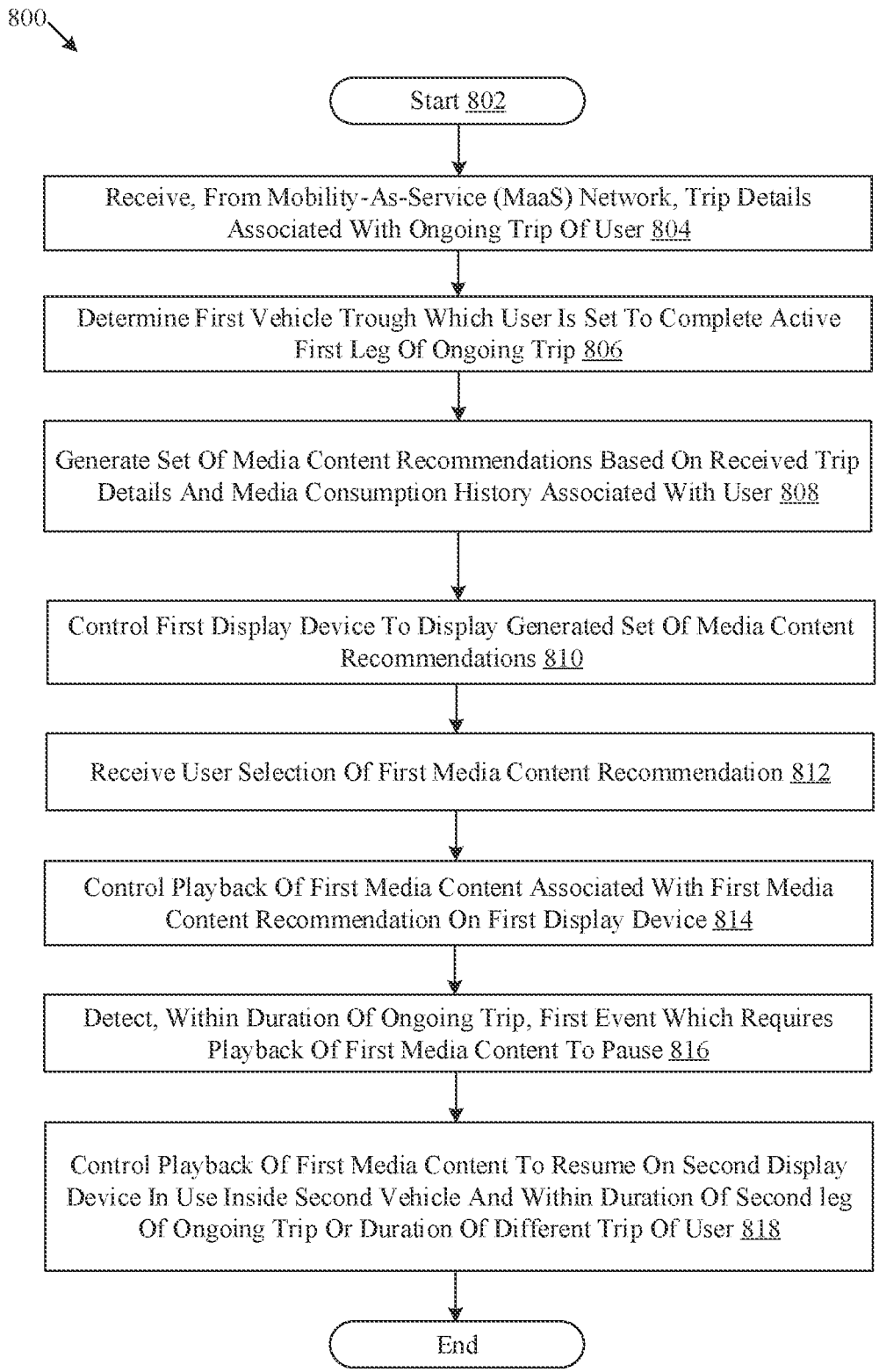
FIG. 8 is a flowchart that illustrates an exemplary method for playback control of media content across devices in a MaaS transportation network, in accordance with an embodiment of the disclosure.

FIG. 8 is a flowchart that illustrates an exemplary method for playback control of media content across devices in a MaaS transportation network, in accordance with an embodiment of the disclosure. FIG. 8 is explained in conjunction with elements from FIGS. 1, 2, 3 4, 5, 6, and 7. With reference to FIG. 8, there is shown a flowchart 800. The method illustrated in the flowchart 800 may be executed by any computing system, such as by the system 102 or the circuitry 202. The method may start at 802 and proceed to 804.

At 804, trip details may be received. In one or more embodiments, the circuitry 202 may be configured to receive, from the MaaS network 104, trip details associated with an ongoing trip of a user (e.g., the user 114). For example, the circuitry 202 may receive the trip details of the user 114 from a first distributed ledger node (e.g., the first MaaS node 126A) of the MaaS network 104. The reception of the trip details is described further, for example, in FIGS. 3 and 7.

At 806, a first vehicle may be determined. In one or more embodiments, the circuitry 202 may be configured to determine the first vehicle (e.g., the first vehicle 112A) by which the user 114 may be set to complete an active first leg of the ongoing trip, as described, for example, in FIG. 3.

At 808, a set of media content recommendations may be generated. In one or more embodiments, the circuitry 202 may be configured to generate the set of media content recommendations based on the received trip details and a media consumption history associated with the user 114, as described, for example, in FIG. 3.

At 810, a first display device may be controlled. In one or more embodiments, the circuitry 202 may be configured to control the first display device (e.g., the first display device 110A) to display the generated set of media content recommendations. The first display device 110A may be in use inside the first vehicle 112A. The control of the first display device 110A to display the generated set of media content recommendations is described further, for example, in FIG. 3.

At 812, a user selection may be received. In one or more embodiments, the circuitry 202 may be configured to receive the user selection of first media content recommendation of the displayed set of media content recommendations. The first media content recommendation may be associated with first media content selected for playback on the first display device 110A.

At 814, a playback of the first media content may be controlled. In one or more embodiments, the circuitry 202 may be configured to control a playback of the first media content associated with the first media content recommendation, on the first display device 110A.

At 816, a first event may be detected. In one or more embodiments, the circuitry 202 may be configured to detect, within a duration of the ongoing trip, the first event which may require the playback of the first media content to pause. Examples of the first event may include, but is not limited to, a completion of the active first leg of the trip or a receipt of a user input from the user 114 that may indicate a command to pause the playback of the first media content.

At 818, the playback of the first media content may be controlled to resume on a second display device in use inside a second vehicle (e.g., the second vehicle 112B) and within a duration of a second leg of the ongoing trip or a duration of a different trip of the user 114. In one or more embodiments, the circuitry 202 may be configured to control the playback of the first media content to resume on the second display device 110B in use inside the second vehicle 112B and within the duration of the second leg of the ongoing trip or the duration of the different trip of the user 114. The control of the playback of the first media content to resume on the second display device 110B is explained further, for example, in FIG. 6. Control may pass to end.

Although the flowchart 800 is illustrated as discrete operations, such as 802, 804, 806, 808, 810, 812. 814, 816 and 818, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer readable medium and/or storage medium having stored thereon, instructions executable by a machine and/or a computer to operate a system (for example, the system 102). The instructions may cause the machine and/or computer to perform operations that include reception, from a Mobility-as-a-Service (MaaS) network (e.g., the MaaS network 104), trip details associated with an ongoing trip of a user (e.g., the user 114). The operations may further include determination of a first vehicle (e.g., the first vehicle 112A) by which the user 114 may be set to complete an active first leg of the ongoing trip. The operations may further include generation of a set of media content recommendations based on the received trip details and a media consumption history associated with the user 114. The operations may further include control of a first display device (e.g., the first display device 110A) to display the generated set of media content recommendations. The first display device 110A may be in use inside the determined first vehicle 112A within a duration of the active first leg. The operations may further include reception of a user selection of a first media content recommendation of the displayed set of media content recommendations. The operations may further include control of a playback of first media content associated with the first media content recommendation on the first display device 110A. The operations may further include detection, within a duration of the ongoing trip, of a first event which may require to pause the playback of the first media content. The operations may further include control of the playback of the first media content to resume on a second display device (e.g., the second display device 110B) in use inside a second vehicle (e.g., the second vehicle 112B) and within a duration of a second leg of the ongoing trip or a duration of a different trip of the user 114.

Exemplary aspects of the disclosure may provide a system (such as, the system 102 of FIG. 1) that includes circuitry (such as the circuitry 202). The circuitry may be configured to receive, from a Mobility-as-a-Service (MaaS) network (such as, the MaaS network 104), trip details associated with an ongoing trip of a user (such as, the user 114). The circuitry 202 may be configured to determine a first vehicle (such as, the first vehicle 112A) by which the user 114 may be set to complete an active first leg of the ongoing trip. The circuitry 202 may be configured to generate a set of media content recommendations based on the received trip details and a media consumption history associated with the user 114. The circuitry 202 may be configured to control a first display device (such as, the first display device 110A) to display the generated set of media content recommendations. The first display device 110A may be in use inside the determined first vehicle 112A within a duration of the active first leg. The circuitry 202 may be configured to receive a user selection of a first media content recommendation of the displayed set of media content recommendations. The circuitry 202 may be configured to control a playback of first media content associated with the first media content recommendation on the first display device 110A. The circuitry 202 may be configured to detect, within a duration of the ongoing trip, a first event which may require the playback of the first media content to pause. The circuitry 202 may be configured to control the playback of the first media content to resume on a second display device (such as, the second display device 110B) in use inside a second vehicle (such as, the second vehicle 112B) and within a duration of a second leg of the ongoing trip or a duration of a different trip of the user 114.

In accordance with an embodiment, the ongoing trip may be divided into legs which are to be covered through a plurality of vehicles (such as, the plurality of vehicles 112A, 112B . . . 112N) of at least one transportation service provider associated with the MaaS network 104. The plurality of vehicles 112A, 112B . . . 112N may include the first vehicle 112A and the second vehicle 112B.

In accordance with an embodiment, the circuitry 202 may be configured to receive a user profile that may include content preferences associated with the user 114 and a device specification associated with the first display device 110A. In accordance with an embodiment, the set of media content recommendations may be generated further based on the received user profile and the device specification.

In accordance with an embodiment, the circuitry 202 may be configured to construct an input feature for a context-aware recommendation model trained on a media content recommendation task. The input feature may be constructed based on one or more of the received trip details, the media consumption history, the received user profile, and the device specification. The circuitry 202 may be further configured to input the constructed input feature to the context aware recommendation model and generate the set of recommendations as an output of the context-aware recommendation model for the input feature.

In accordance with an embodiment, the circuitry 202 may be configured to control, based on the detected first event, the first display device 110A to display a first option to pause the playback of the first media content on the first display device 110A and resume the playback on the second display device 110B in the second leg of the ongoing trip. The circuitry 202 may be configured to receive a first user input comprising a selection of displayed first option. The playback of the first media content may be controlled to resume on the second display device 110B further based on the received first input.

In accordance with an embodiment, each of the first display device 110A and the second display device 110B may be one of: a dashboard display of the first vehicle 112A and the second vehicle 112B respectively, a rear seat entertainment device of the first vehicle 112A and the second vehicle 112B respectively, a headrest display of the first vehicle 112A and the second vehicle 112B respective, or a personal mobile device (e.g., the display device 116) of the user 114.

In accordance with an embodiment, the circuitry 202 may be configured to control the second display device 110B to display a second option to resume the playback of the first media content based on a determination that the second vehicle 112B may lack an in-vehicle display. The second display device 110B may be a personal mobile device (e.g., the display device 116) of the user 114. The circuitry 202 may be further configured to receive a second user input including a selection of the second option. The playback of the first media content may be controlled to resume on the second display device 110B further based on the received second input.

In accordance with an embodiment, the circuitry 202 may be configured to control the playback of the first media content to pause on the first display device 110A based on a determination that the detected first event may be indicative of an end of the first active leg of the ongoing trip.

In accordance with an embodiment, the circuitry 202 may be configured to determine, within a full duration of the first media content, a timestamp at which the playback of the first media content may be paused based on the detected event. The circuitry 202 may be further configured to record the timestamp on a database (e.g., distributed ledger sub-nodes 128 (e.g., the document sub-node 128C).

In accordance with an embodiment, the playback of the first media content may be controlled to resume from the recorded timestamp on the second display device 110B.

In accordance with an embodiment, the circuitry 202 may be configured to receive a trip status associated with the ongoing trip from a first distributed ledger node (e.g., the first MaaS node 126A) of the MaaS network 104. The circuitry 202 may be configured to detect, based on the received trip status, a second event that may indicate that the user 114 may be onboard the second vehicle 112B to cover the second leg of the ongoing trip. The circuitry 202 may be further configured to retrieve the recorded timestamp from the distributed ledger sub-nodes 128 (e.g., the document sub-node 128C) based on the detected second event. The playback of the first media content may be controlled to resume from the retrieved timestamp on the second display device 110B.

In accordance with an embodiment, the circuitry 202 may be configured to generate a transport stream including the first media content based on a device specification of the first display device 110A. The circuitry 202 may be further configured to generate a series of chunks of the generated transport stream. Each chunk of the generated series of chunks may be non-overlapping with other chunks of the generated series of chunks. The circuitry 202 may be configured to store the generated series of chunks on a media server.

In accordance with an embodiment, the circuitry 202 may be configured to transmit a service requirement comprising a Quality of Service (QoS) requirement and a set of mobility network management functions to a virtual network operator (e.g., the virtual network operator 402). The virtual network operator 402 may receive the transmitted service requirement; and transmit, based on the received service requirement, a network resource request to an infrastructure provider (e.g., the infrastructure provider 404) associated with a mobile wireless network (e.g., the communication network 108).

In accordance with an embodiment, the infrastructure provider 404 may create a virtual network (e.g., the virtual network 406) to allocate network resources of the mobile wireless network (e.g., the communication network 108), in accordance with the service requirement.

In accordance with an embodiment, the created virtual network 406 may determine, within the duration of the ongoing trip, a first base station (e.g., the first base station 408A) of the mobile wireless network (e.g., the communication network 108) to which the first display device 110A may be connected to stream a first set of chunks of the stored series of chunks on the media server for the playback on the first display device 110A. The created virtual network 406 may determine, based on trip route information associated with the ongoing trip, a second base station (e.g., the second base station 408B) of the mobile wireless network (e.g., the communication network 108) to which the first display device 110A may be likely to connect after a handover from the first base station 408A. The created virtual network 406 may transmit, before the handover, a second set of chunks of the stored series of chunks to an edge computing device (e.g., the edge computing device 410) associated with the second base station 408B.

In accordance with an embodiment, the edge computing device 410 may receive the transmitted second set of chunks before the handover and cache the transmitted second set of chunks. After the handover, the edge computing device 410 may transmit the cached second set of chunks to the first display device for the playback of a portion of the first media content on the first display device 110A.

In accordance with an embodiment, the circuitry 202 may be configured to collect, within the duration of the ongoing trip, first media consumption information associated with the first media content on the first display device 110A and the second display device 110B. The circuitry 202 may be further configured to transmit a transaction message including the collected first media usage information to the MaaS network 104. The MaaS network 104 may be configured to receive the transmitted transaction message and update a record on a first distributed ledger node (e.g., the first MaaS node 126A) of MaaS network 104. The record may be updated by an execution of a transaction on the first distributed ledger node (e.g., the first MaaS node 126A) based on the received transaction message. The updated record may include consolidates media usage statistics associated with the first media content from all users who may have viewed the first media content.

In accordance with an embodiment, the MaaS network 104 may store a first smart contract, which may store payment settlement rules agreed upon by a provider of the MaaS network 104 and at least one transportation service provider (e.g., the first transportation service provider 720A and the second transportation service provider 720B) associated with the MaaS network 104. The MaaS network 104 may execute, based on the updated record associated with the first media content, the stored first smart contract to settle payments with the provider of the MaaS network 104 and the at least one transportation service provider (e.g., the first transportation service provider 720A and the second transportation service provider 720B).

In accordance with an embodiment, the MaaS network 104 may store a second smart contract, which may store royalty payment rules agreed upon by a provider of the MaaS network 104 and a content owner (e.g., the content owner 722) of the first media content. The MaaS network 104 may execute, based on the updated record associated with the first media content, the stored second smart contract to settle a royalty payment with the content owner 722.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:
1. A system, comprising:
   circuitry configured to:
      receive, from a Mobility-as-a-Service (MaaS) network, trip details associated with an ongoing trip of a user;
      determine a first vehicle by which the user is set to complete an active first leg of the ongoing trip;
      generate a set of media content recommendations based on the received trip details and a media consumption history associated with the user;
      control a first display device to display the generated set of media content recommendations, wherein the first display device is in use inside the determined first vehicle within a duration of the active first leg;
      receive a user selection of a first media content recommendation of the displayed set of media content recommendations;

control a playback of first media content associated with the first media content recommendation on the first display device;

detect, within a duration of the ongoing trip, a first event which requires the playback of the first media content to pause; and control, based on the detected first event, the first display device to display a first option to pause the playback of the first media content on the first display device and resume the playback on a second display device in a second leg of the ongoing trip;

receive a first user input comprising a selection of the displayed first option; and control, based on the received first user input, the playback of the first media content to resume on the second display device in use inside a second vehicle and within a duration of the second leg of the ongoing trip or a duration of a different trip of the user.

2. The system according to claim 1, wherein
the ongoing trip is divided into legs which are to be covered through a plurality of vehicles of at least one transportation service provider associated with the MaaS network, and
the plurality of vehicles comprises the first vehicle and the second vehicle.

3. The system according to claim 1, wherein the circuitry is further configured to receive a user profile comprising content preferences associated with the user and a device specification associated with the first display device.

4. The system according to claim 3, wherein the circuitry is further configured to generate the set of media content recommendations based on the received user profile and the device specification.

5. The system according to claim 3, wherein the circuitry is further configured to:
construct an input feature for a context-aware recommendation model trained on a media content recommendation task,
wherein the input feature is constructed based on at least one of the received trip details, the media consumption history, the received user profile, and the device specification;
input the constructed input feature to the context-aware recommendation model; and
generate the set of media content recommendations as an output of the context-aware recommendation model for the input.

6. The system according to claim 1, wherein each of the first display device and the second display device is one of a dashboard display of the first vehicle, a rear seat entertainment device of the first vehicle, a headrest display of the first vehicle, or a personal mobile device of the user.

7. The system according to claim 1, wherein the circuitry is further configured to:
control the second display device to display a second option to resume the playback of the first media content based on a determination that the second vehicle lacks an in-vehicle display, wherein the second display device is a personal mobile device of the user;
receive a second user input comprising a selection of the second option; and
control, based on the received second user input, the second display device to resume the playback of the first media content.

8. The system according to claim 1, wherein the circuitry is further configured to control the playback of the first media content to pause on the first display device based on a determination that the detected first event is indicative of an end of the first active leg of the ongoing trip.

9. The system according to claim 1, wherein the circuitry is further configured to:
determine, within a full duration of the first media content, a timestamp at which the playback of the first media content is paused based on the detected event; and
record the timestamp on a database.

10. The system according to claim 9, wherein the circuitry is further configured to control the second display device to resume the playback of the first media content from the recorded timestamp.

11. The system according to claim 9, wherein the circuitry is further configured to:
receive a trip status associated with the ongoing trip from a first distributed ledger node of the MaaS network;
detect, based on the received trip status, a second event that indicates that the user is onboard the second vehicle to cover the second leg of the ongoing trip;
retrieve the recorded timestamp from the database based on the detected second event; and
control the second display device to resume the playback of the first media content from the retrieved timestamp.

12. The system according to claim 1, wherein the circuitry is further configured to:
generate a transport stream comprising the first media content based on a device specification of the first display device;
generate a series of chunks of the generated transport stream, wherein each chunk of the generated series of chunks is non-overlapping with other chunks of the generated series of chunks; and
store the generated series of chunks on a media server.

13. The system according to claim 12, wherein the circuitry is further configured to transmit a service requirement comprising a Quality of Service (QoS) requirement and a set of mobility network management functions to a virtual network operator, wherein the virtual network operator:
receives the transmitted service requirement; and
transmits, based on the received service requirement, a network resource request to an infrastructure provider associated with a mobile wireless network.

14. The system according to claim 13, wherein the infrastructure provider creates a virtual network to allocate network resources of the mobile wireless network based on the service requirement.

15. The system according to claim 14, wherein the created virtual network:
determines, within the duration of the ongoing trip, a first base station of the mobile wireless network to which the first display device is connected to stream a first set of chunks of the stored series of chunks on the media server for the playback on the first display device;
determines, based on trip route information associated with the ongoing trip, a second base station of the mobile wireless network to which the first display device is likely to connect after a handover from the first base station to the second base station; and
transmits, before the handover, a second set of chunks of the stored series of chunks to an edge computing device associated with the second base station.

16. The system according to claim 15, wherein the edge computing device:
receives the transmitted second set of chunks before the handover;

caches the transmitted second set of chunks; and transmits, after the handover, the cached second set of chunks to the first display device for the playback of a portion of the first media content on the first display device.

17. The system according to claim 1, wherein the circuitry is further configured to:

collect, within the duration of the ongoing trip, first media consumption information associated with the first media content on the first display device and the second display device; and transmit a transaction message comprising the collected first media consumption information to the MaaS network, wherein the MaaS network is configured to:

receive the transmitted transaction message; and update a record on a first distributed ledger node of MaaS network, execute a transaction on the first distributed ledger node of the MaaS network based on the updated record and the received transaction message, and consolidate, based on the updated record, media consumption statistics associated with the first media content from all users who have viewed the first media content.

18. The system according to claim 17, wherein the MaaS network:

stores a first smart contract which stores payment settlement rules agreed upon by a provider of the MaaS network and at least one transportation service provider associated with the MaaS network; and executes, based on the updated record associated with the first media content, the stored first smart contract to settle payments with the provider of the MaaS network and the at least one transportation service provider.

19. The system according to claim 17, wherein the MaaS network:

stores a second smart contract which stores royalty payment rules agreed upon by a provider of the MaaS network and a content owner of the first media content; and executes, based on the updated record associated with the first media content, the stored second smart contract to settle a royalty payment with the content owner.

20. A method, comprising:

in a system:

receiving, from a Mobility-as-a-Service (MaaS) network, trip details associated with an ongoing trip of a user;

determining a first vehicle by which the user is set to complete an active first leg of the ongoing trip;

generating a set of media content recommendations based on the received trip details and a media consumption history associated with the user;

controlling a first display device to display the generated set of media content recommendations, wherein the first display device is in use inside the determined first vehicle within a duration of the active first leg;

receiving a user selection of a first media content recommendation of the displayed set of media content recommendations;

controlling a playback of first media content associated with the first media content recommendation on the first display device;

detecting, within a duration of the ongoing trip, a first event which requires the playback of the first media content to pause;

controlling, based on the detected first event, the first display device to display a first option to pause the playback of the first media content on the first display device and resume the playback on a second display device in a second leg of the ongoing trip;

receiving a user input comprising a selection of displayed first option; and controlling, based on the received user input, the playback of the first media content to resume on the second display device in use inside a second vehicle and within a duration of the second leg of the ongoing trip or a duration of a different trip of the user.

21. A non-transitory computer-readable medium having stored thereon, computer-executable instructions which, when executed by a system, cause the system to execute operations, the operations comprising:

receiving, from a Mobility-as-a-Service (MaaS) network, trip details associated with an ongoing trip of a user;

determining a first vehicle by which the user is set to complete an active first leg of the ongoing trip;

generating a set of media content recommendations based on the received trip details and a media consumption history associated with the user;

controlling a first display device to display the generated set of media content recommendations, wherein the first display device is in use inside the determined first vehicle within a duration of the active first leg;

receiving a user selection of a first media content recommendation of the displayed set of media content recommendations;

controlling a playback of first media content associated with the first media content recommendation on the first display device;

detecting, within a duration of the ongoing trip, a first event which requires the playback of the first media content to pause;

controlling, based on the detected first event, the first display device to display a first option to pause the playback of the first media content on the first display device and resume the playback on a second display device in a second leg of the ongoing trip;

receiving a user input comprising a selection of displayed first option; and controlling, based on the received user input, the playback of the first media content to resume on the second display device in use inside a second vehicle and within a duration of the second leg of the ongoing trip or a duration of a different trip of the user.

* * * * *